United States Patent
Loomis et al.

(10) Patent No.: US 12,448,773 B2
(45) Date of Patent: Oct. 21, 2025

(54) DEFECT-HIDING SURFACE TEXTURES

(71) Applicant: CertainTeed Gypsum, Inc., Malvern, PA (US)

(72) Inventors: Garrett Loomis, Newton, MA (US); Rachel Z. Pytel, Newton, MA (US); Brice Dubost, Newton, MA (US); Sizhu You, Auburndale, MA (US); Vural Kara, Northboro, MA (US); Stephen W. Reynolds, Mississauga (CA); Jennifer H. Czerepinski, Framingham, MA (US); Aditi Naik, Nashua, NH (US)

(73) Assignee: CertainTeed Gypsum, Inc., Malvern, PA (US)

( * ) Notice: Subject to any disclaimer, the term of this patent is extended or adjusted under 35 U.S.C. 154(b) by 9 days.

(21) Appl. No.: 16/791,882

(22) Filed: Feb. 14, 2020

(65) Prior Publication Data
US 2020/0263423 A1     Aug. 20, 2020

Related U.S. Application Data

(60) Provisional application No. 62/819,327, filed on Mar. 15, 2019, provisional application No. 62/806,592, filed on Feb. 15, 2019.

(51) Int. Cl.
*E04B 9/04*        (2006.01)
*B32B 3/30*        (2006.01)
(Continued)

(52) U.S. Cl.
CPC ............... *E04B 9/0464* (2013.01); *B32B 3/30* (2013.01); *B32B 5/30* (2013.01); *C09D 5/00* (2013.01);
(Continued)

(58) Field of Classification Search
CPC ........... E04B 9/0464; B32B 3/30; B32B 5/30; B32B 2264/101; B32B 2264/105;
(Continued)

(56) References Cited

U.S. PATENT DOCUMENTS

| 9,696,465 B2 | 7/2017 | Miyake |
| 2002/0110668 A1 | 8/2002 | Pinault |

(Continued)

FOREIGN PATENT DOCUMENTS

| DE | 3929761 C2 | 7/1997 |
| EP | 0358495 A1 | 3/1990 |

(Continued)

OTHER PUBLICATIONS

International Search Report and Written Opinion in PCT/US2020/018398, dated Jun. 16, 2020.
(Continued)

*Primary Examiner* — Maria V Ewald
*Assistant Examiner* — Ethan Weydemeyer
(74) *Attorney, Agent, or Firm* — McDonnell Boehnen Hulbert & Berghoff LLP

(57) ABSTRACT

The present disclosure relates generally to a surface structure for construction products, for example, suitable for construction products that cover visible interior surfaces, such as drywall and ceiling panels. The present disclosure relates more particularly to an interior surface construction product including a visible surface covered with a texture including surface features having a height in a range from 20 μm to 2500 μm. The visible surface has an average rotational derivative that is no greater than 1.2*a respective rotational derivative of a Lambertian surface under the same lighting and viewing conditions. The rotational derivative is the percentage change in radiance from the visible surface in a viewing direction when illuminated in an illumination direc- (Continued)

tion as the surface rotates about an axis that is perpendicular to a plane defined by the viewing direction and the illumination direction.

17 Claims, 37 Drawing Sheets

(51) Int. Cl.
  *B32B 5/30* (2006.01)
  *C09D 5/00* (2006.01)
  *C09D 7/40* (2018.01)
  *C09D 7/61* (2018.01)
(52) U.S. Cl.
  CPC .......... *C09D 7/61* (2018.01); *C09D 7/70* (2018.01); *B32B 2264/101* (2013.01); *B32B 2264/105* (2013.01); *B32B 2264/107* (2013.01); *B32B 2419/04* (2013.01); *Y10T 428/24372* (2015.01)
(58) Field of Classification Search
  CPC . B32B 2264/107; B32B 2419/04; C09D 5/00; C09D 7/61; C09D 7/70; B05D 5/02; Y10T 428/24372; Y10T 428/24355; Y10T 428/2443
  See application file for complete search history.

(56) References Cited

U.S. PATENT DOCUMENTS

| | | | |
|---|---|---|---|
| 2004/0062898 A1* | 4/2004 | Felegi, Jr. | C09D 7/69 428/44 |
| 2010/0215907 A1* | 8/2010 | Spires | B05D 3/12 451/36 |
| 2013/0288042 A1* | 10/2013 | Haines | B05D 1/28 428/339 |
| 2015/0151567 A1 | 6/2015 | Schronk | |
| 2015/0284573 A1* | 10/2015 | Hannig | B32B 38/0008 524/424 |
| 2018/0203165 A1 | 7/2018 | Trapani | |
| 2019/0032341 A1* | 1/2019 | Fleet | B32B 15/10 |

FOREIGN PATENT DOCUMENTS

| | | |
|---|---|---|
| GB | 1588203 A | 4/1981 |
| JP | H06-316998 A | 11/1994 |
| JP | 2015-078492 A | 4/2015 |
| WO | 2009043483 A2 | 4/2009 |

OTHER PUBLICATIONS

Krumbein, W. C., "Measurement and Geological Significance of Shape and Roundness of Sedimentary Particles," Journal of Sedimentary Petrology 11, 64-72 (1941).

Carleton College, "GEL 324 Sedimentology—Particle Shape Analysis," modified Jul. 2006, available at https://serc.carleton.edu/files/NAGTWorkshops/sedimentary/activities/particle_shape.pdf.

D. Guarnera et al., "BRDF Representation and Acquisition," STAR—State of the Eurographics 2016, 35(2) (2016).

* cited by examiner

DEFECT-HIDING SURFACE TEXTURES

CROSS REFERENCE TO RELATED APPLICATIONS

This application claims the benefit of priority of U.S. Provisional Patent Application No. 62/806,592, filed Feb. 15, 2019 and U.S. Provisional Patent Application No. 62/819,327, filed Mar. 15, 2019, each of which is hereby incorporated herein by reference in its entirety.

BACKGROUND OF THE DISCLOSURE

1. Field of the Disclosure

The present disclosure relates generally to a surface structure for a construction product, for example, suitable for construction products that cover visible interior surfaces, such as drywall and ceiling tiles. The present disclosure relates more particularly to a construction product with a visible surface having a texture including small surface features that promote the concealment of surface defects.

2. Technical Background

It is challenging to install surface construction products, such as drywall, siding, and roofing tiles, in a manner that forms a perfectly flat surface. During the installation of the products, even skilled professionals are sometimes unable to avoid a small bend in the construction product or a bump or indentation formed during installation. This issue is most prevalent at the joints between panels/products. Under most circumstances these imperfections cannot be perceived by people who are viewing the constructed surface. However, under certain conditions, even small deviations from a flat surface are noticeable. In particular, when a construction surface is viewed from a very shallow angle under grazing light, even small imperfections may be noticeable.

For example, when building an internal wall, the joint between two pieces of drywall is covered by a joint compound which that is then smoothed by a professional builder. Making the wall perfectly smooth requires great skill as well as significant time and expense. Accordingly, in most building projects, the builder will smooth out a large bump, but allow for a shallow bump of joint compound to remain. However, even very shallow bumps, for example bumps having a "height" less than 1 mm spread over 500 mm can be visible when viewed from a shallow angle under grazing lighting.

In view of the visibility of small bumps and other minimal defects, the present inventors have recognized that a construction surface that is capable of hiding small defects would be advantageous and attractive to builders.

SUMMARY OF THE DISCLOSURE

In one aspect, the present disclosure provides an interior construction product configured to form an interior surface, the interior construction product comprising:
  a visible surface covered with a texture including surface features having a height in a range from 20 µm to 2500 µm, the visible surface having a first rotational derivative that is no greater than 1.2*a respective rotational derivative of a Lambertian surface under the same lighting and viewing conditions,
  wherein the rotational derivative is the percentage change in radiance from the visible surface in a viewing direction when illuminated from an illumination direction as the surface rotates about an axis that is perpendicular to a plane defined by the viewing direction and the illumination direction,
  wherein the average rotational derivative is the average of first, second, and third rotational derivatives of the visible surface,
  wherein each of the first, second, and third rotational derivatives correspond to an illumination direction at a first illumination angle from a surface normal of the visible surface,
  wherein the first rotational derivative corresponds to a viewing direction at a first viewing angle from the surface normal of the visible surface,
  wherein the second rotational derivative corresponds to a viewing direction at a second viewing angle from the surface normal of the visible surface, and
  wherein the third rotational derivative corresponds to a viewing direction at a third viewing angle from the surface normal of the visible surface.

In another aspect, the disclosure provides a construction surface comprising:
  a first construction product according to the disclosure;
  a second construction product according to the disclosure adjacent to the first construction product and positioned such that the visible surface of the second construction product is substantially parallel to the visible surface of the first construction product.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

As described above, the present inventors have noted that a construction surface that is capable of hiding small defects would be advantageous and attractive to builders and finishers. The present inventors have unexpectedly determined that a construction surface with surface features that result in a low rotational derivative can provide defect hiding characteristics.

Accordingly, one aspect of the disclosure is an interior construction product configured to form an interior surface, the interior construction product including a visible surface that is covered with a texture including surface features having a height in a range from 20 µm to 2500 µm. The visible surface has an average rotational derivative that is no greater than 1.2*a respective rotational derivative of a Lambertian surface under the same lighting and viewing conditions, where the rotational derivative is the percentage change in radiance from the visible surface in a viewing direction when illuminated from an illumination direction as the surface rotates about an axis that is perpendicular to a plane defined by the viewing direction and the illumination direction. The average rotational derivative, as used herein, is the average of first, second, and third rotational derivatives of the visible surface, where each of the first, second, and third rotational derivatives correspond to an illumination direction at a first illumination angle from a surface normal of the visible surface. The first rotational derivative corresponds to a viewing direction at a first viewing angle from the surface normal of the visible surface, the second rotational derivative corresponds to a viewing direction at a second viewing angle from the surface normal of the visible surface, and the third rotational derivative corresponds to a viewing direction at a third viewing angle from the surface normal of the visible surface.

Figure 1:
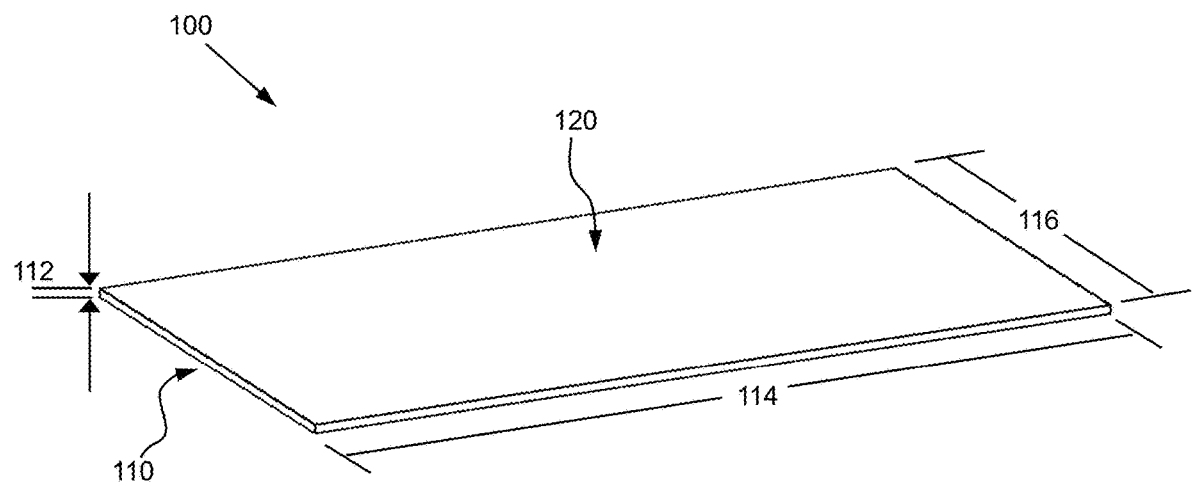
FIG. 1 is a schematic perspective view of a construction product according to an embodiment of the disclosure.

Such an interior construction product is shown in perspective view in FIG. 1. Construction product 100 includes a base structure 110 and a visible surface 120 that extends across the base structure. The construction product has a thickness 112, a length 114 and a breadth 116. In certain embodiments, the thickness is in a range of 1 centimeter to 10 centimeters. In certain embodiments, the length is at least 30 centimeters. Further, in certain embodiments, the breadth of the construction product is at least 10 centimeters. The visible surface 120 has a rough texture that includes a plurality of surface features (FIG. 2).

Although the visible surface is rough on a very small scale, for example in the range of millimeters or smaller, the visible surface may appear relatively smooth on a larger scale. For example, on a scale of tens of centimeters, or meters, the visible surface presents a macro surface that appears monolithic, without bumps, indentations, or other surface features at these scales. For instance, from a larger scale perspective, the visible surface may present a flat or smoothly curved macro surface, despite having a rough micro surface. Accordingly, geometric characteristics of features of the visible surface at a micro scale, may be referenced against the geometry of the macro surface presented by the visible surface as a whole. For example, if the visible surface, as a whole, presents a planar surface, a portion of a surface feature may be disposed at an angle to the planar macro surface of the visible surface. Likewise, if the visible surface is generally a curved surface, an element that is described as being at an angle to the macro surface of the visible surface should be understood as being at an angle to the nearest tangent of the macro surface.

Figure 2:
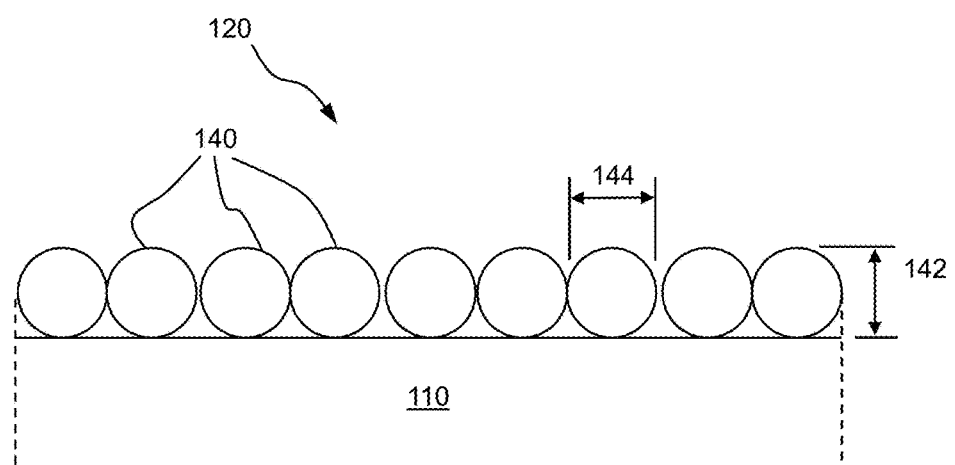
FIG. 2 is a schematic detailed side view of a portion of the construction product of FIG. 1.

FIG. 2 shows a detailed view of the surface features 140 on the visible surface 120. The surface features 140 on the visible surface are three dimensional and have a height 142 in a direction perpendicular to visible surface 120, a width 144 along visible surface 120 and a length along visible surface 120 in a direction that is perpendicular to the width (the direction into the page in FIG. 2). In certain embodiments, the surface features are distributed regularly across the visible surface. For example, in certain embodiments, the average width of the surface features is no more than 3× the average height of the surface features and no less than 0.25× the height of the surface features. In some embodiments, the surface features are rotationally symmetrical and the length of the surface features is similar to the width. In other embodiments, the surface features are in the form of elongate ridges and have a length that is considerably longer than the width. Further, in certain embodiments, the average space between the surface features is no greater than 4× the height of the surface features.

The present inventors have identified that even small defects in an architectural surface may be visible under certain lighting conditions, particularly when the lighting and viewing angles are both grazing angles. For example, such a defect may be present at a drywall joint or mechanical fastener. The area where two drywall panels meet or the depression formed by a fastener is typically filled in with a joint compound, which is then smoothed to a desired level. Even after smoothing, the joint compound may form a small bump or indentation on the surface of the drywall panels. The visibility of this bump or indentation can be reduced by spreading the compound across the surface, so that the bump becomes wider. However, the inventors have found that even bumps as small as 0.5 mm that are spread out over 1000 mm are still visible under grazing lighting and viewing conditions. Making the bump smaller or spread out further requires considerable time, effort and expertise.

Figure 3:
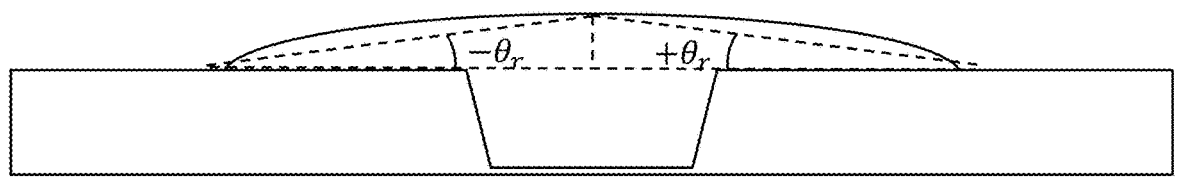
FIG. 3 depicts a model of a drywall joint bump.

The present inventors have also identified that changes in the intensity of light that is reflected from a surface with small changes in the lighting and viewing angles have a substantial impact on the visibility of defects, such as the above-described bump at a drywall joint. A joint bump can be approximated as two back to back wedges, with a surface on one side of the bump that is at a shallow positive angle with respect to the surrounding plane, and a second surface on the other side of the bump that is at a shallow negative angle with respect to the surrounding plane. A joint bump and the corresponding linear approximation are schematically depicted in FIG. 3. As shown, the bump is approximated as an angled surface at $-\theta_r$ on the left side of the bump and an angled surface at $\theta_r$ on the right side of the bump. Typical joint bumps have a bump height and breadth such that the angle of the opposing surfaces is $\theta_r \approx 0.25$-$1.00°$, where bumps with $\theta_r$ of 0.5° or greater are more likely to be visible. Thus, the overall difference in angle between the two sides of the bump from the light source and viewer is only 1 degree. Nonetheless, this small change in the angle of the surfaces from the perspective of the light source and viewer can result in noticeable differences in the intensity of the light that is detected by the viewer on each side of the bump. In particular, if the viewer perceives that one side of the bump is brighter than the other, the bump will be noticeable. The same is also true for any other surface defect.

The intensity of light perceived by a viewer from a surface is dependent on the radiance of the light source in the direction from the light source to the surface, the irradiance onto the surface, and the light leaving the surface in the direction of the viewer. The radiance of the light source is the flux/power per unit projected area of surface and per unit solid angle; it can be conceptualized as brightness. The irradiance on the surface is the radiance projected onto the surface, which will be dependent upon the angle of the surface with respect to the path of the light. For example, if a surface is normal to a light "beam" projected onto it, the light will be concentrated on the surface and appear bright, whereas, if the surface is at a steep angle to the direction of the light, the light "beam" will spread out and the intensity of the light incident on any portion of the surface will be less. Thus, even for a light source of constant radiance, the irradiance on the surface will vary depending on the angle of the surface with respect to the direction of the light path.

Figure 4:
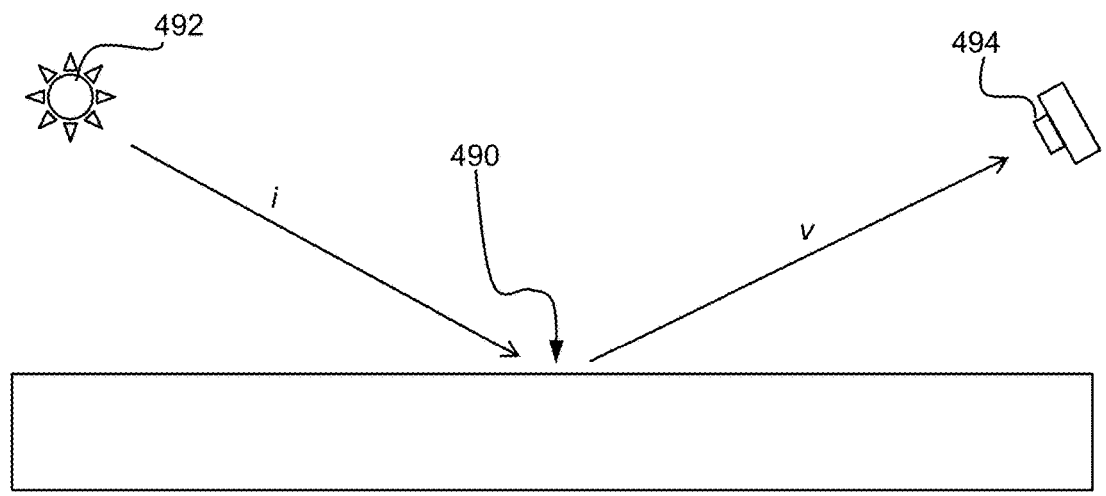
FIG. 4 depicts light interaction on a surface from an illumination source to a viewer.

To evaluate the perceived brightness at the surface, the relevant query is, given a light source of a specific radiance from a first direction, how bright will the surface appear to an observer in a second direction. FIG. 4 is a schematic depiction of this scenario. Light from a light source 492 extends in an illuminating direction i toward a flat surface 490. From surface 490, a portion of the light is reflected along direction v toward the viewer 494. The question of the brightness that is perceived by the viewer is encapsulated by the Bi-directional Reflectance Distribution Function (BRDF), which gives the ratio of the reflected radiance in the direction v relative to the light irradiance from direction i. The BRDF is a function of the light and view directions (i and v) and the specific reflection properties of the surface material. Modifications to the micro-surface of the material directly affect the BRDF function and thus the way that light is reflected from the surface.

Figure 5:
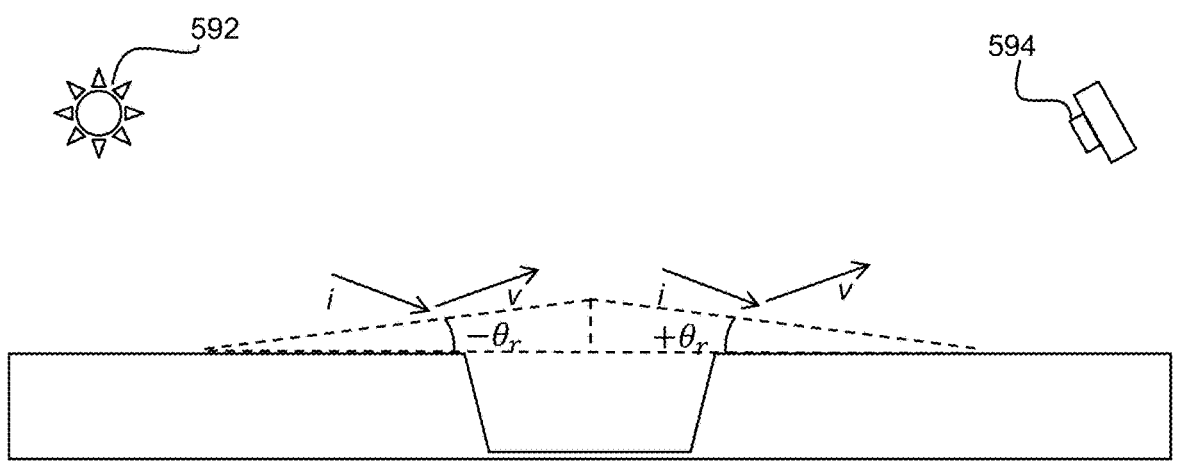
FIG. 5 depicts light interaction across a modelled joint bump.

FIG. 5 schematically depicts the variance in the light's interaction with the surface between the two sides of the bump. In the model, the light source 592 and viewer 594 are both at considerable distances from the bump with respect to the size of the bump. Accordingly, the direction of the illuminating light i and the light in the viewing direction v are the same on each side of the bump. However, because the surface has a negative angle on the left side of the bump, the direction of the illuminating light i is steeper with respect to the surface, while the direction of the viewing light v is shallower with respect to the surface. Likewise, because the surface has a positive angle on the right side of the bump, the direction of the illuminating light i is shallower with respect to the surface, while the direction of the viewing light v is steeper with respect to the surface. These differences in the angles of i and v with respect to the illuminated surface can cause differences in the intensity of light that is received by the viewer from these two surfaces. In particular, if the intensity of the light changes dramatically with small angular tilts of the illuminated surface, the bump, or any other defect, will be highly visible.

The rotational derivative quantifies the change in the intensity of the light from the illuminated surface as its angle changes with respect to the illumination direction and the direction of the viewer. The rotational derivative is defined as the %-change in radiance in the viewing direction as the surface rotates/tilts while holding all other parameters (such as radiance of the light source, direction of the light source and direction of the viewer) constant. If the rotational derivative of a surface is small, the brightness should not vary significantly with changes in angle. Accordingly, even at two different angles, such as on either side of a bump or other defect, the light intensity from a surface with a low rotational derivative will be similar and possibly imperceptible. Therefore, surfaces with a low rotational derivative are able to effectively hide surface defects, because a viewer will not perceive changes in the brightness of the surface even where it has bumps or indents.

As explained in more detail with respect to certain embodiments below, a textured surface having certain surface features will control the light reflecting off the surface in a manner that reduces the rotational derivative. Depending on the method used, the surface's rotational derivative can be reduced over a wide range of angles, or targeted to specific ranges of i and v where defect visibility is of greatest concern.

The rotational derivative of a surface is dependent on how the surface reflects light. Specular reflection occurs when light rays are reflected from the surface of an optically smooth object (smooth micro-surface), such as a mirror. Under these conditions, the light is reflected according to the Law of Reflection, which states that the outgoing rays have the same angle of incidence as the incoming rays, but in the opposite direction. In contrast to specular reflection, diffuse reflection can occur when light rays enter the material, are absorbed/scattered in the material body, and are then re-emitted randomly in all available directions. A Lambertian surface is a surface that is perfectly diffuse. Although the light reflected from a Lambertian surface is spread equally in all directions, the incidence angle of the illuminating light plays a primary role in the brightness of the surface, and is the primary influencer of the rotational derivative of a Lambertian surface. Given a constant light flux from the illumination source, the amount of light that impinges upon the surface is dependent upon its angle relative to the illumination source. At grazing angles, where the illuminating light is projected onto the surface at a very shallow angle, the light is spread out over the surface and the area density of absorbed and scattered light is small. At these low lighting levels, small variances in the light intensity per unit area on the surface can drastically change the brightness of the surface. Accordingly, the rotational derivative of a Lambertian surface at grazing angles rises dramatically. Despite the rise in the rotational derivative of a Lambertian surface at very steep grazing illumination angles, diffuse surfaces hide defects better than many other surfaces. Therefore, the rotational derivative of a Lambertian surface is an excellent benchmark for the performance of a high defect-hiding surface. Nonetheless, embodiments described herein achieve rotational derivatives below that of a Lambertian surface, under certain lighting conditions.

Accordingly, in certain embodiments as otherwise described herein, the first illumination angle is within a range of −88° to −65° from a surface normal of the visible surface, e.g., within a range of −80° to −70° from the surface normal of the visible surface. Thus, in certain embodiments, the average rotational derivative corresponds to a grazing illumination angle, where the visible surface is illuminated from a low angle with respect to the surface. As explained above, at grazing illumination angles many surfaces have a very high rotational derivative. In certain embodiments, the visible surface of the construction product has a rotational derivative at such grazing illumination angles that is comparable or lower than a Lambertian surface.

In certain embodiments as otherwise described herein, the average rotational derivative of the visible surface is no greater than the respective rotational derivative of the Lambertian surface under the same lighting and viewing conditions, e.g., the average rotational derivative of the visible surface is less than 0.8*the rotational derivative of the Lambertian surface under the same lighting and viewing conditions. For example, in some embodiments, the rotational derivative of a surface of the construction product when illuminated at a particular angle and viewed from various other angles generally has a lower rotational derivative than a Lambertian surface illuminated and viewed at these same angles.

In certain embodiments as otherwise described herein, the visible surface has an average rotational derivative over a range of illumination angles that is no greater than 1.2*the respective rotational derivatives of the Lambertian surface, e.g., no greater than 1*the respective rotational derivatives of the Lambertian surface, e.g., no greater than 0.8*the respective rotational derivatives of the Lambertian surface. For example, in some embodiments the surface of the construction product has a rotational derivative under various lighting conditions that is lower than a Lambertian surface under those same conditions. For example, in certain embodiments as otherwise described herein, the range of illumination angles extends from −88° to −65° from the surface normal of the visible surface. Further, in some embodiments, the range of illumination angles extends from −80° to −70° from the surface normal of the visible surface.

In certain embodiments as otherwise described herein, the first viewing angle is in a range from 63° to 67°, e.g., 65°, wherein the second viewing angle is in a range from 68° to 72°, e.g., 70°, and wherein the third viewing angle is in a range from 73° to 77°, e.g., 75°. Thus, in certain embodiments, the first rotational derivative corresponds to a grazing viewing angle, where the visible surface is viewed from a very low angle with respect to the surface. In many cases, conventional materials have high rotational derivatives when viewed from grazing angles. In certain embodiments, the visible surface of the construction product has a rotational derivative at such grazing viewing angles that is comparable or lower than a Lambertian surface viewed from the same viewing directions.

In certain embodiments as otherwise described herein, the second viewing angle is at least 5° larger than the first viewing angle, and the third viewing angle is at least 5° larger than the second viewing angle. Accordingly, the three viewing angles used to measure the respective rotational derivatives are spread out by at least 10°.

At a microscopic level, rough surfaces appear as peaks and valleys referred to as the microsurface. As long as the microsurface features or microfacets are greater in magnitude than the wavelength of the incident light, reflection will occur from the microfacets in a similar way as it would from a larger smooth surface. That is, with specular reflection on the microfacet, the light will exit at exactly the same angle that it arrived, while diffuse reflection will depend only on the incidence angle and will re-emit randomly from the microfacet. Thus, the behavior of the light will depend on the orientation of the microfacets, instead of the macrosurface. A rough surface, with microfacets arranged at a large range of angles with respect to the macro surface will direct light in various directions. The scattering of the light caused by the microfacets prevents bulk specular reflection with respect to the macro surface and thereby reduces the rotational derivative. Moreover, surfaces with microfacets having specific angular and special distributions, as described further herein, can reduce the rotational derivative under some or all reflection conditions.

The orientation of microfacets on most rough surfaces approximate a normalized distribution, where the majority of microfacets are disposed at an angle similar to the macro surface, i.e., where most of the microfacets are relatively flat. These majority flat microfacets, which share a similar orientation, all interact with the illuminating light similarly and do little to reduce the rotational derivative. However, other distributions of the microfacet orientation dramatically reduce the rotational derivative. If the microfacet distribution provides a broad range of angles of the microfacets, the facets scatter the light in a range of directions, leading to a more diffusive surface with a lower rotational derivative.

More specific distributions of the angles and positions of the microfacets, as described below, can further reduce the rotational derivative.

In certain embodiments as otherwise described herein, the surface features provide a roughness to the visible surface such that less than 50% of the visible surface is disposed at an angle smaller than 20° from a macro surface of the visible surface, e.g., less than 30% of the visible surface is disposed at an angle smaller than 20° from the macro surface of the visible surface, e.g., less than 20% of the visible surface is disposed at an angle smaller than 20° from the macro surface of the visible surface. In certain embodiments as otherwise described herein, less than 50% of the visible surface is disposed at an angle smaller than 15° from a macro surface of the visible surface, e.g., less than 30% of the visible surface is disposed at an angle smaller than 15° from the macro surface of the visible surface, e.g., less than 20% of the visible surface is disposed at an angle smaller than 15° from the macro surface of the visible surface.

Figure 6:
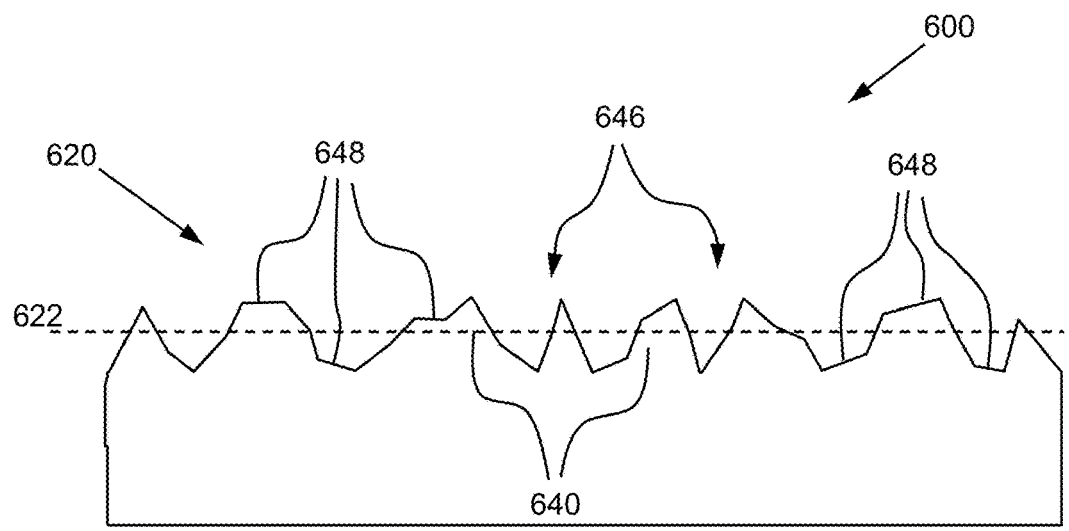
FIG. 6 is a schematic detailed side view of a portion of a construction product according to an embodiment of the disclosure.

For example, FIG. 6 is a detailed view of a section of a construction product 600 that has a roughened visible surface 620 and presents a planar macro surface 622. The roughened visible surface 620 includes a plurality of irregular surface features 640 that may be represented by micro facets 646. A portion of visible surface 620 is covered by areas of the surface that are relatively flat with respect to the macro surface 622. These flat regions of visible surface 620 are represented by relatively flat micro facets 648 in FIG. 6. The flat regions make up a small portion of visible surface 620. Specifically, flat regions that are at an angle of less than 20° from macro surface 622 make up less than 20% of visible surface 620 and regions that are at an angle of less than 15° from macro surface 622 make up less than 10% of visible surface 620. By specifying the shape of the microfacet angle distribution, the relative populations of facet angles on the surface is controlled which then has a large impact on the distribution of reflected light.

In certain embodiments the surface features are spaced apart from one another. The distance between the surface features can be characterized by the height of the features. For example, in some embodiments, the distance between the base of the neighboring features is in a range of 10% to 500% of the height of the features, e.g., in a range of 10% to 50%, or 50% to 100%, or 100% to 200% or 200% to 500%. Further, in some embodiments, the distance between the peaks of two neighboring features is in a range of 50% to 500% of the height of the features, e.g., in a range of 50% to 75%, or 75% to 100%, or 100% to 150%, or 150% to 250%, or 250% to 500%.

Figure 7:
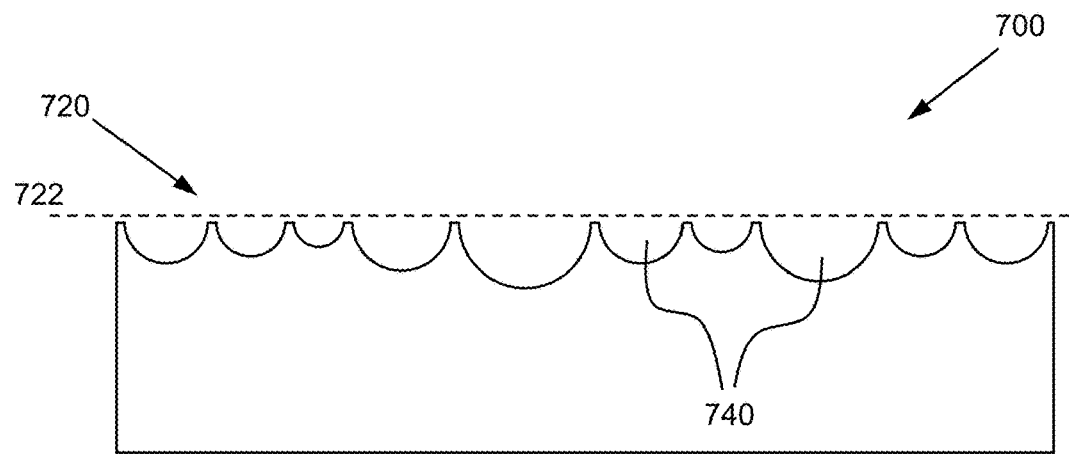
FIG. 7 is a schematic detailed side view of a portion of a construction product according to another embodiment of the disclosure.

In certain embodiments as otherwise described herein, the surface features include intruding features extending inward with respect to a macro surface of the visible surface. In certain embodiments as otherwise described herein, the intruding features include craters. For example, FIG. 7 is a detailed view of a section of construction product 700 that has a roughened visible surface 720 and presents a planar macro surface 722. The roughened visible surface 720 includes a plurality of intruding surface features 740 that extend inward with respect to macro surface 722. In other words, the intruding surface features 740 extend toward a bottom surface of construction product 700. Intruding surface features 740 of visible surface 720 are craters that vary in size. In some embodiments, such craters are formed by a foaming process.

In certain embodiments as otherwise described herein, the surface features include protruding features extending outward with respect to a macro surface of the visible surface.

Figure 8:
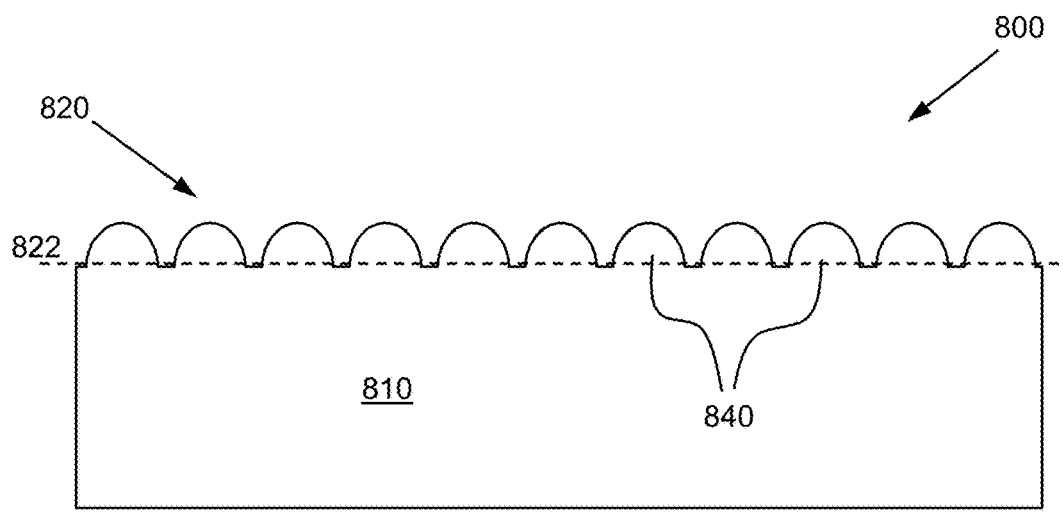
FIG. 8 is a schematic detailed side view of a portion of a construction product according to yet another embodiment of the disclosure.

In certain embodiments as otherwise described herein, the protruding features include rounded surface features, e.g., features having a spherical, elliptical or parabolic shape. For example, FIG. 8 shows a detailed view of a section of construction product 800, which includes a roughened visible surface 820 having semi-spherical surface features 840. The surface features 840 extend outward with respect to macro surface 822, which is in the form of a plane.

The rotational symmetry of rounded surface features can assist in reducing the rotational derivative. The symmetry can help equalize the surface area available for reflection between different viewing angles, which reduces the rotational derivative. For example, in a construction product having spherical surface features, consider when the macro surface is at a first angle relative to the illuminating light and a portion of the spherical surface feature is normal to the light and another portion is at a steep angle to the light. If the macro surface rotates slightly, the illuminating light will shift on the spherical surface feature, but a new portion will be normal to the light and another new portion will be at a steep angle to the light. Accordingly, this rotational symmetry can dampen the impact of rotational changes on the amount of surface radiance from the visible surface as a whole.

Figure 9:
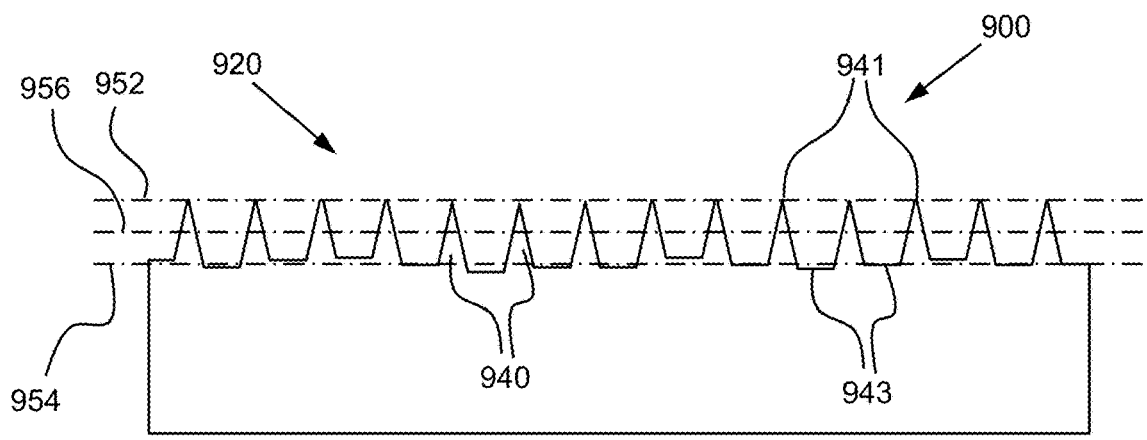
FIG. 9 is a schematic detailed side view of a portion of a construction product according to another embodiment of the disclosure.

In other embodiments, the rounded surface features extend along the length of the construction product. For example, in some embodiments, the surface features are cylindrical and run along the length of the construction product. Such surface features can still take advantage of the rotational symmetry of the light reflection on the surface features if the features are oriented perpendicular to the most severe grazing light beams. In other embodiments, the surface features are not rounded. For example, in some embodiments the surface features may be polygonal, such as pyramids, triangular ridges or columns. Construction product 900, for example, includes triangular surface features, as shown in FIG. 9.

In certain embodiments as otherwise described herein, each surface feature includes an upper peak and extends to a lower valley and the texture includes a rough zone with an upper end at the average height of the upper peaks of the surface features and a lower end at the average depth of the lower valleys. The rough zone has a midpoint between the upper end and the lower end. A first portion of the visible surface is disposed at an angle smaller than 20° from a macro surface of the visible surface, and a majority of the first portion of the visible surface is below the midpoint of the rough zone. For example, construction product 900, shown in FIG. 9, includes a visible surface 920 that includes a plurality of surface features 940. Each surface feature includes an upper peak 941 and a lower valley 943. A rough zone 950 is formed between an upper end 952 at the average height of the peaks 941 of the surface features 940 and a lower end 954 at the average depth of the valleys 943. The rough zone 950 also includes a midpoint 956 between the upper end 952 and the lower end 954. It should be understood that the upper end, lower end and midpoint are all surfaces that extend parallel to the macro surface of the visible surface 920.

In addition to the steep angles of the surface features 940, visible surface 920 also includes flat areas, for example, areas that are at an angle of less than 20° with respect to the macro surface of visible surface 920. In visible surface 920, a majority of this flat portion of the visible surface is below midpoint 956 of rough zone 950. Indeed, all of the flat sections of visible surface 920 shown in FIG. 9 are below the midpoint 956. In other embodiments, some flatter sections, e.g., sections at an angle less than 20° from the macro surface, are above the midpoint of the rough zone and some flatter sections are below the midpoint. In some embodiments, a majority of this flatter portion is below the midpoint of the rough zone, while in other embodiments, the majority of this portion is above the midpoint.

Figure 10A:
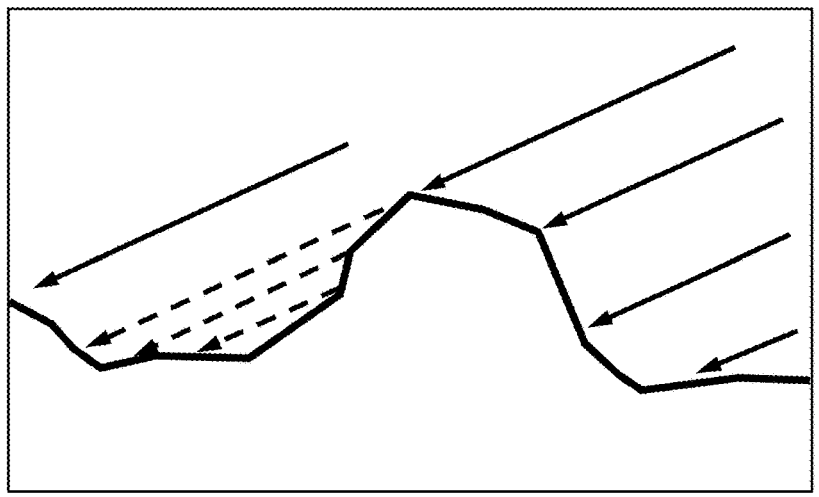
FIG. 10A depicts the shadowing of light caused by a surface feature.
Figure 10B:
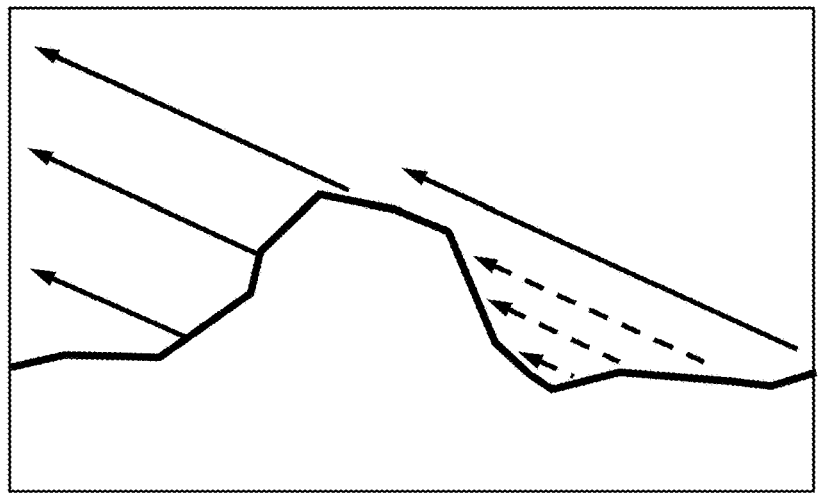
FIG. 10B depicts the masking of reflected light caused by a surface feature.

Shadowing and masking also play a significant role in manipulating the rotational derivative. Shadowing occurs when adjacent regions of the textured surface obstruct incoming light from reaching areas of the surface. FIG. 10A schematically depicts shadowing, where portions of the surface are cast in the shadow of a surface feature and do not receive light from the light source. Likewise, FIG. 10B schematically depicts masking, where light that has reflected off a portion of the surface is masked by a surface feature before it reaches a viewer. Both of these phenomenon can reduce the amount of light that is directed toward the viewer, especially under grazing conditions. By placing the flat regions at low positions within the rough zone, grazing light will be significantly blocked from the flat surfaces, thereby avoiding specular reflection on those surfaces. For example, in construction product 900, the surface features 940 block light from specular reflection on the flat portion of visible surface 920. Surfaces such as visible surface 920 can includes large portions of flat areas without giving rise to a high rotational derivative resulting from specular reflection.

Figure 11:
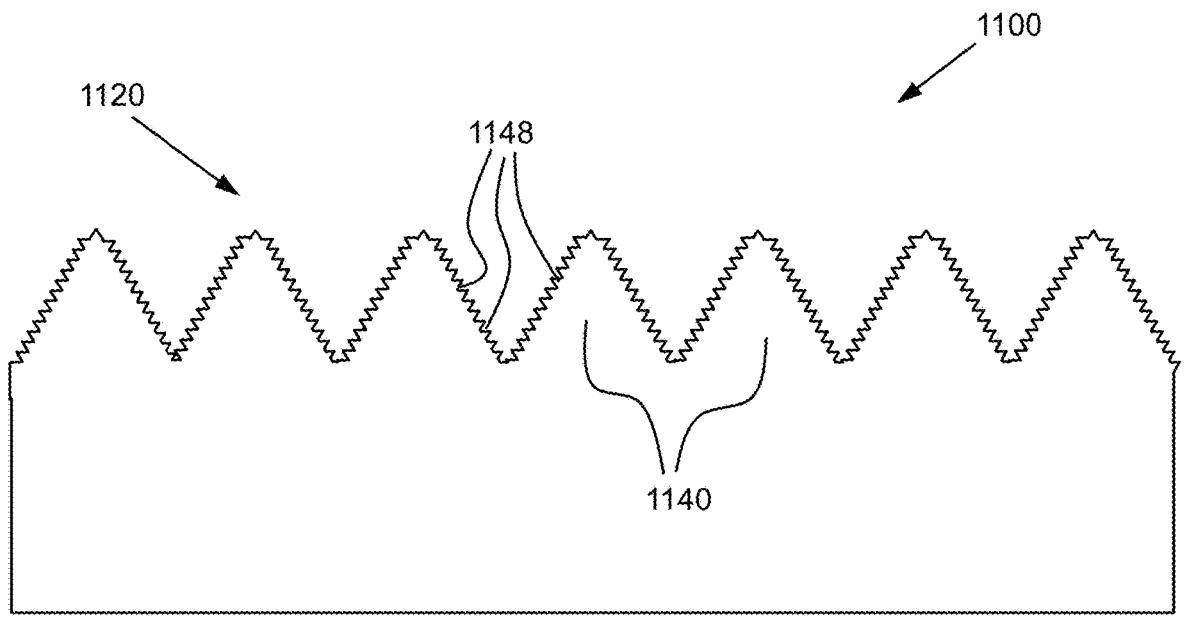
FIG. 11 is a schematic detailed side view of a portion of a construction product according to another embodiment of the disclosure.

In certain embodiments as otherwise described herein, the surface features include features having different scales of roughness. In some embodiment, a portion of the surface features includes surface features having a height in a range of 100 to 1000 μm. In certain embodiments as otherwise described herein, the visible surface includes micro-surface features disposed on the surface features, wherein the micro-surface features have a height in a range of 1 to 50 μm. For example, FIG. 11 is a detailed view of a section of a construction product 1100 that has a roughened visible surface 1120. Visible surface 1120 has large surface features 1140 having a height in a range of 100 to 1000 μm. Visible surface 1120 also includes micro surface features 1148 disposed on surface features 1140. These micro surface features can add to the reduction in the rotational derivative and the hiding ability of the visible surface by providing additional shadowing, masking, and scattering of light impinging upon the visible surface. Further, the multi-scale roughness provided by having both large surface features and micro-surface features may provide additional benefits to limited the rotational derivative that is greater than the linear additions of the reflection from each of the two scales of roughness individually.

In certain embodiments as otherwise described herein, the construction product includes a base structure, and wherein the surface features are formed in base structure. For example, construction product 800, shown in FIG. 8, includes surface features 840 that are integrated into base structure 810. In some embodiments, such integrated surface features are formed by carving or etching a portion of the base structure. In other embodiments, the surface features are integrated into the base structure through a casting or extruding process. Still in other embodiments, the surface features are integrally formed with the base structure through additive manufacturing, such as 3D printing.

Figure 12:
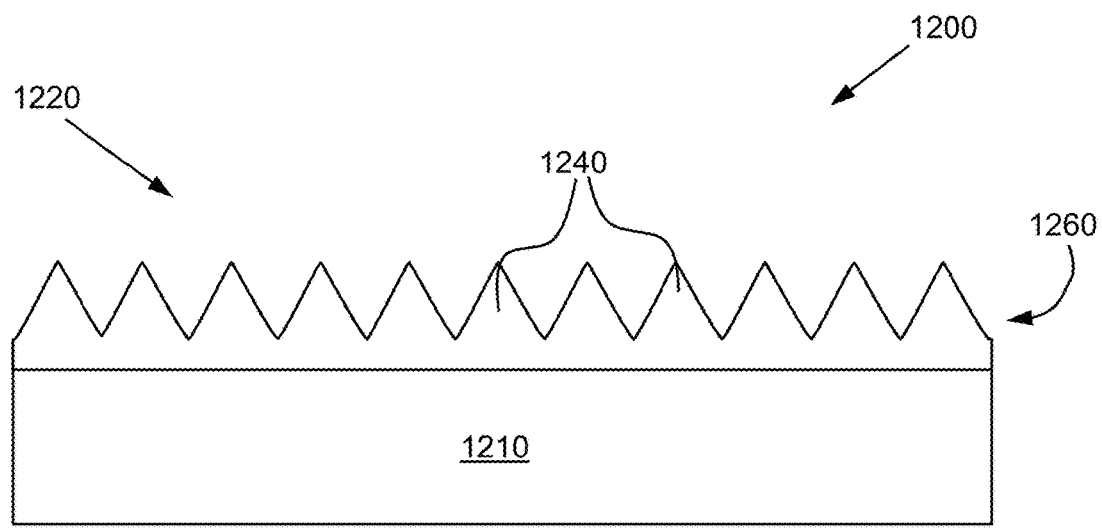
FIG. 12 is a schematic detailed side view of a portion of a construction product according to yet another embodiment of the disclosure.

In certain embodiments as otherwise described herein, the construction product includes a base structure and an overlay disposed on the base structure that forms the visible surface, and wherein the surface features are formed in the overlay. For example, FIG. 12 is a detailed view of a section of a construction product 1200 that has a base structure 1210 and an overlay 1260 disposed thereon. Overlay 1260 forms the visible surface 1220 of construction product 1200 and includes surface features 1240 that cover the surface. The overlay may be a laminate or other sheet, as will be appreciated by those of ordinary skill in the art.

Figure 13:
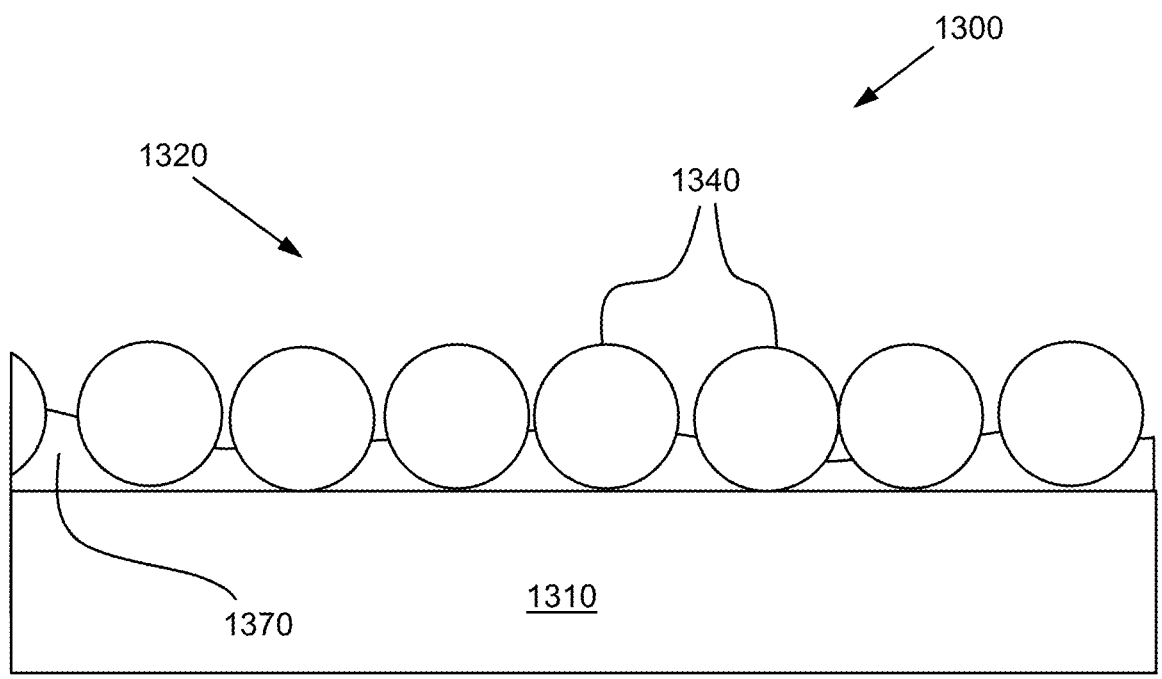
FIG. 13 is a schematic detailed side view of a portion of a construction product according to another embodiment of the disclosure.
Figure 14A:
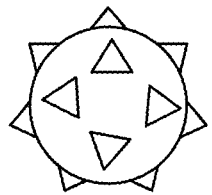
FIG. 14A is a schematic side view of a particle for use as a surface feature according to an embodiment of the disclosure.
Figure 14B:
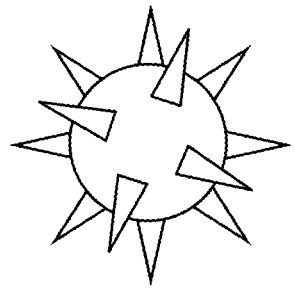
FIG. 14B is a schematic side view of a particle for use as a surface feature according to another embodiment of the disclosure.
Figure 14C:
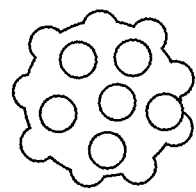
FIG. 14C is a schematic side view of a particle for use as a surface feature according to another embodiment of the disclosure.
Figure 14D:
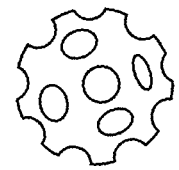
FIG. 14D is a schematic side view of a particle for use as a surface feature according to another embodiment of the disclosure.

In certain embodiments as otherwise described herein, the construction product includes a base structure and particles disposed over the base structure that form the surface features of the visible surface. For example, construction product 100, as shown in FIG. 2, includes a base structure 110 with surface features 140 in the form of particles disposed on the base structure. Likewise, FIG. 13 is a detailed view of a section of a construction product 1300 that has base structure 1310 and a roughened visible surface 1320. Visible surface 1320 is created, in part, by surface features 1340 that are formed as particles disposed on base structure 1310. The particles 1340 extend outward from base structure 1310 and manipulate light that is reflected off the visible surface 1320 in a manner that modifies the rotational derivative. In various embodiments, the particles that form the surface features can take a variety of different forms and shapes. For example, in some embodiments, the particles have a spherical base shape, such as particles 1340 in construction product 1300. In other embodiments, the particles have a more irregular granule shape. Still in other embodiments, the particles are polygonal 3D structures, and in other embodiments, the particles have extensions that spread from a central node, such as an X-shaped particle. Other shapes are also possible, as will be appreciated by those of ordinary skill in the art.

In some embodiments, the particles include glass beads, sand, proppants. Other particles are also possible, such as ceramics or mineral particles, including particles granulated and/or sintered from ceramic and mineral powders. In some embodiments, the particles have a diameter in a range from 0.04 mm to 1.5 mm, e.g., from 0.04 mm to 0.125 mm, or 0.1 mm to 0.5 mm, or 0.4 mm to 2.0 mm, or 0.6 mm to 0.8 mm, or 0.75 mm to 1.5 mm.

In certain embodiments as otherwise described herein, the particles cover at least 10% of the visible surface, e.g., at least 20% of the visible surface, e.g., at least 30% of the visible surface, e.g., at least 50% of the visible surface. Thus, in some embodiments, the particles cover a portion of the visible surface while the underlying base structure, or a coating thereon, cover the remaining portion of the visible surface. Still, in other embodiments, the particles are provided in several layers and substantially all of the visible surface is covered by the particles.

In certain embodiments as otherwise described herein, the particles are held in a coating disposed over the base structure. For example, particles 1340 in construction product 1300 are embedded in a coating 1370 that is disposed over the base structure. In some embodiments, the coating surrounds the particles so that substantially all of the visible surface is covered by the coating. In other embodiments, a thin layer of the coating adheres the particles, which stick out from the coating. In some embodiments, the coating has a measurable thickness and impacts the lighting characteristics of the visible surface in areas between the surface features. In other embodiments, the particles that form the surface features are bonded over the base structure without any measureable coating forming part of the visible surface.

In certain embodiments, the particles are disposed directly on the base structure of the construction product. In other embodiments, the base structure is covered by one or more protective or functional layers and the particles are disposed on these layers.

In certain embodiments, the particles are mixed with a coating material which is applied to an outer surface of the base structure of the construction product. For example, in some embodiments a mixture of a coating material and surface feature particles is sprayed onto the outer surface of the base structure. In other embodiments, the mixture is applied with a roller or by another method. In some embodiments, the coating material includes a paint or a primer.

In certain embodiments as otherwise described herein, the outer surface of the particles is rounded. For example, in some embodiments, the particles have an average roundness index of at least 0.5. The terms roundness index and sphericity index, as used herein, refer to the roundness index and sphericity index described in Waddell, H., "Volume, Shape, and Roundness of Rock Particles," *Journal of Geology* 40:443-51 (1932) and Waddell H. "Sphericity and Roundness of Rock Particles" *Journal of Geology* 41:310-331 (1933), each of which is hereby incorporated herein by reference in its entirety. The roundness index and spericity index can be measured using the estimates described in Krumbein, W. C., "Measurement and Geological Significance of Shape and Roundness of Sedimentary Particles." *Journal of Sedimentary Petrology* 11:64-72 (1941), which is hereby incorporated herein by reference in its entirety. Similarly, in some embodiments, the particles have a large number of sides, such as facets, contributing to a rounded characteristic of the particles. For example, in some embodiments, the particles have an average of at least 10 sides, e.g., at least 15 sides, e.g., at least 20 sides.

In other embodiments, the outer surface is jagged. For example, in some embodiments, the particles are polygonal. Further, in other embodiments the particles have pointed sub-structures resembling a star.

In certain embodiments as otherwise described herein, the particles that form the surface features have a base shape and include micro features disposed on a surface of the base shape. For example, the surface feature shown in FIG. 14 is formed as a particle having a spherical base shape, and have conical micro features that extend outward from the spherical base shape.

In certain embodiments as otherwise described herein, the micro features are protruding features that extend outward from the surface of the base shape, e.g., triangular or spherical micro features. In some embodiments, the micro features can have a range of different sizes. For example, FIGS. 14A-D show different particles that are used as surface features in various embodiments of construction products. The different particles each have a unique shape. Each of the particles shown in FIGS. 14A, 14B and 14C includes a spherical base shape and protruding micro features that extend outward from the spherical base shape. Further, the particles of FIGS. 14A and 14B have conical or triangular micro features of two different sizes, while the particle of FIG. 14C has spherical protruding micro features that extend out from the spherical base shape. In certain embodiments as otherwise described herein, the micro features are intruding features that extend inward from the surface of the base shape, e.g., craters. For example, the particle shown in FIG. 14D has a spherical base shape with intruding micro features in the form of craters on the surface of the base shape. While each of the embodiments of particles shown in FIGS. 14A-14D have a spherical base shape, other base shapes are also possible as will be appreciated by those of ordinary skill in the art. For example, in some embodiments, the particles have a pyramid base shape, while other embodiments have a cubic base shape.

In certain embodiments as otherwise described herein, the visible surface includes a layer of paint. For example, in some embodiments, the construction product includes a layer of paint at the visible surface. In these embodiments, the roughness provided by the surface features and the light controlling characteristics of the visible surface are provided with the layer of paint disposed on the construction product.

In certain embodiments as otherwise described herein, the construction product is a wall board. For example, in some embodiments, the construction product is a gypsum board or drywall product and the described visible surface is disposed on the front side of the gypsum board.

In certain embodiments as otherwise described herein, the construction product is a siding product. For example in some embodiments, the construction product is a vinyl or polyurethane siding product. The siding product may be formed from other materials, as will be appreciated by those of ordinary skill in the art.

In certain embodiments as otherwise described herein, the construction product is a ceiling panel. For example, in some embodiments, the construction product is a ceiling tile for use with a ceiling grid and the described visible surface is disposed on the lower side of the ceiling tile.

In certain embodiments as otherwise described herein, the construction product is a roofing product. For example, in some embodiments, the construction product is a roofing tile or asphalt shingle and the visible surface is disposed on the exposed portion of the top of the roofing product.

Example Investigations in Physical Environment

Figure 15:
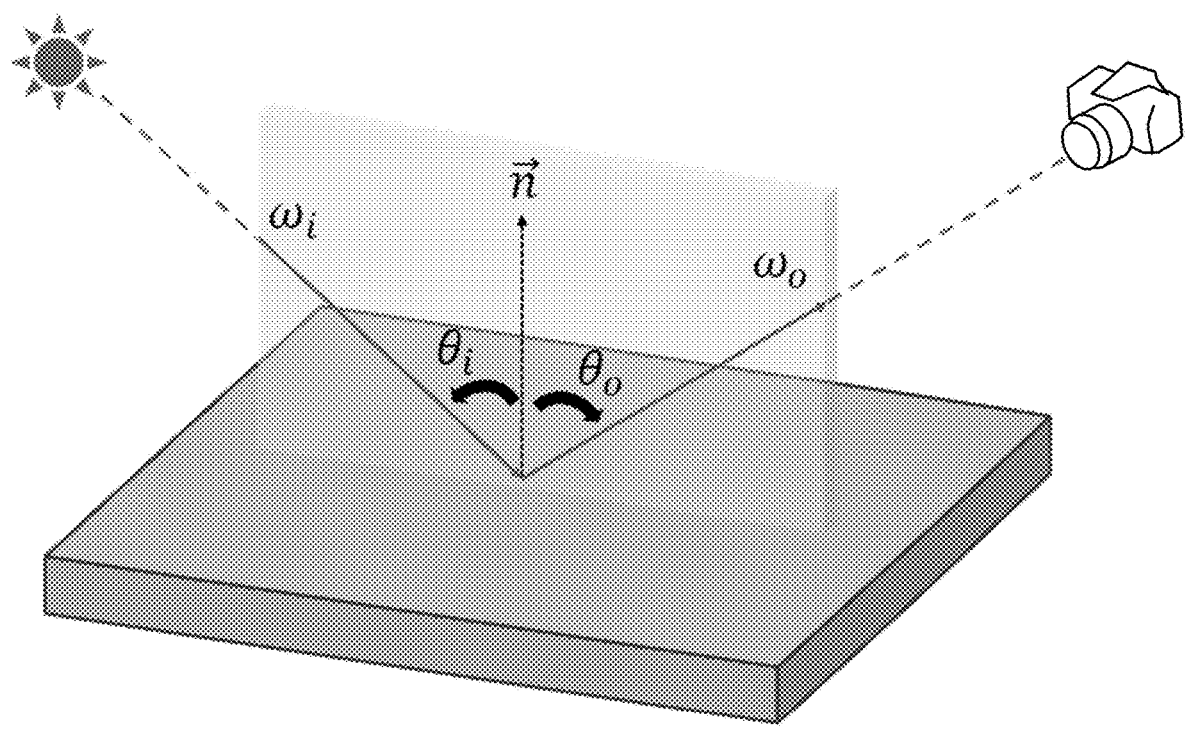
FIG. 15 is a schematic depiction of an experimental setup for measuring light interaction with a visible surface.

An imaging device was used to measure the rotational derivative of various samples. FIG. 15 schematically depicts the setup for the investigation. A light source was arranged to illuminate the visible surface of a construction product along an illumination direction $\omega_i$ that is at an angle $\theta_i$ from the surface normal n. Likewise, a camera was arranged to receive light reflected from the visible surface along a viewing direction $\omega_o$ that is disposed at an angle $\theta_o$ from the surface normal n.

For the investigations in the physical environment, the sample was illuminated with an LED line light and imaged with a digital camera both disposed at a reasonable distance from the sample to reduce or eliminate changes in the illumination direction $\omega_i$ of the line light and the viewing direction $\omega_o$ of the camera. The LED line light, digital camera, and sample were carefully aligned in a plane and the desired angles $\theta_i$ and $\theta_o$ were selected. During data collection, the sample was tilted $\Delta n°$ toward the light source, returned to neutral, and then tilted $\Delta n°$ towards the camera, with raw images of the sample collected at each step. The image files were then converted to linear 16-bit black and white TIFF image files, which were then processed to calculate the average pixel value of the sample surfaces at each position. The rotational derivative was then calculated using the average pixel value at the different tilt positions.

Conventional Surfaces

Figure 16:
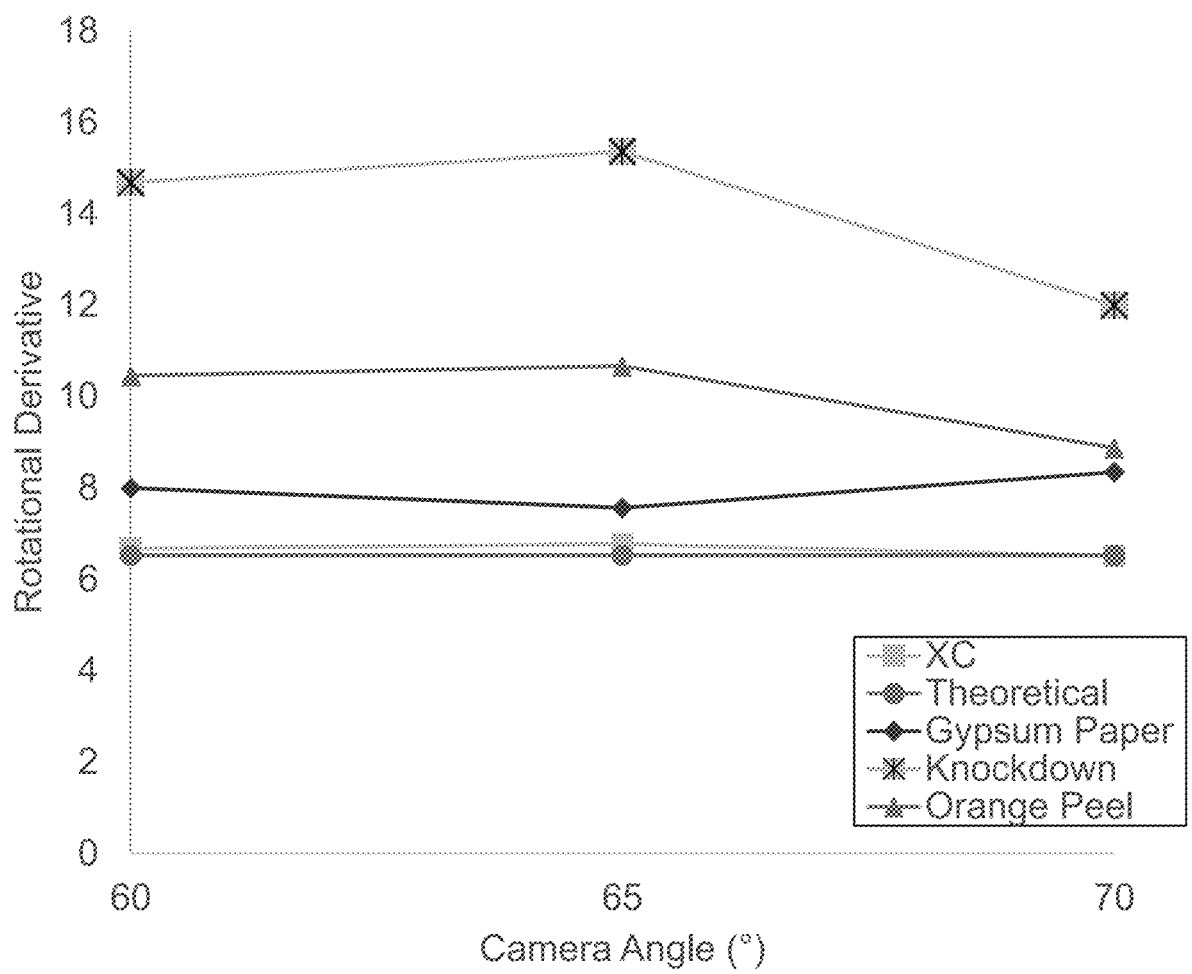
FIG. 16 shows measured rotational derivatives of conventional surfaces.

Samples of conventional construction surfaces, including gypsum paper, knockdown, and orange peel, were prepared, and rotational derivatives of the samples were measured according to the above described procedure using an illumination angle of −75°, viewing angles of 60°, 65° and 70° and a surface rotation $\Delta n°$ of 2°. The results are shown in FIG. 16, along with the theoretical rotational derivative of a Lambertian surface, as well as a measured value for a colorchecker (XC) with an exceptionally diffuse surface. FIG. 16 demonstrates that the conventional surfaces have higher rotational derivatives than the theoretical value or colorchecker.

3-D Printed Texture Samples

Various 3D printed textures were measured to determine the correlations of physical textured surfaces with theoretical values and values calculated in a virtual environment. In an analysis depicted by FIG. 17A, samples were created having facet distributions of medium roughness and high roughness. The samples were scaled up from real-world dimensions in order to allow for 3D printing. The 3D printed test pieces were 100 mm wide and 10 mm thick and included an array of v-cavity surfaces of differing depths that covered the samples. Each v-cavity had a width of 2.5 mm and a length of 5 mm that accounted for both opposing facets of the v-cavity. The sample had 648 v-cavities in total with a 5 mm frame around the perimeter. The sample with medium roughness had a GGX distribution of $\alpha=0.4$, while the sample with high roughness had a GGX distribution of $\alpha=0.8$.

Figure 17A:
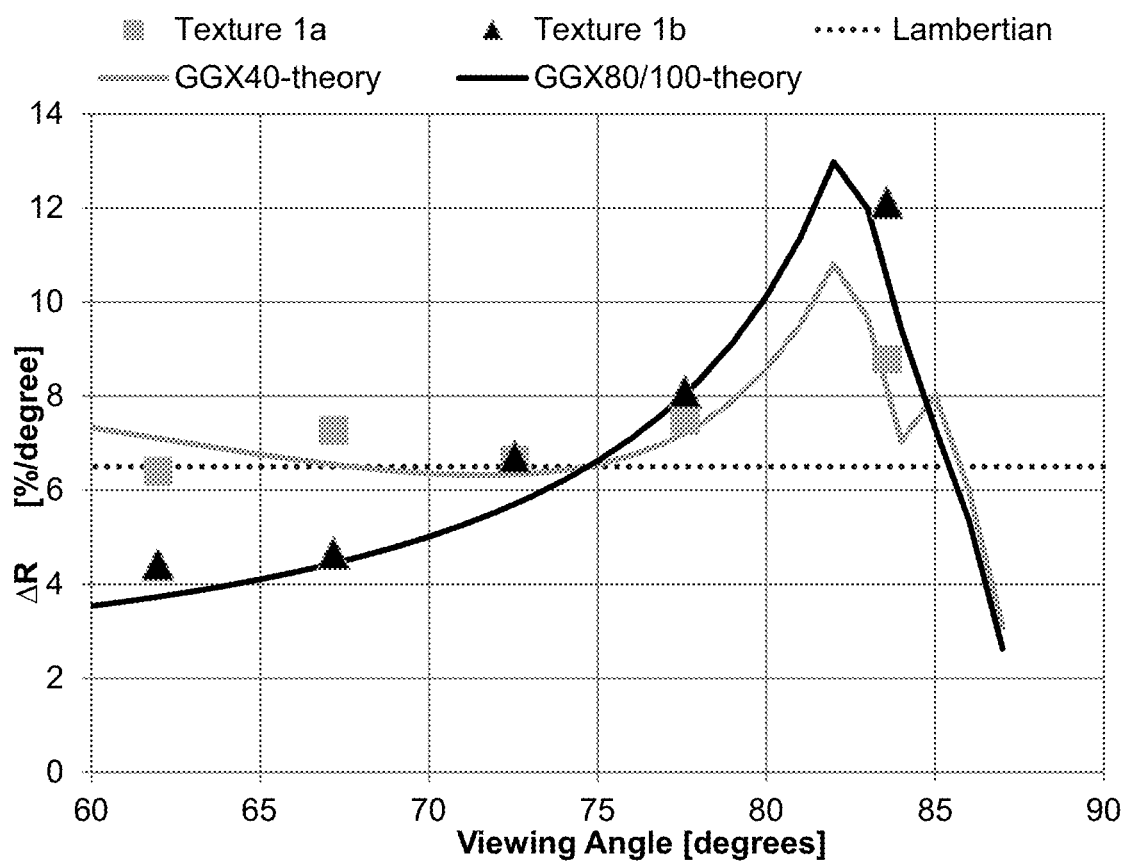
FIGS. 17A and 17B shows measured rotational derivatives of 3D printed samples.

Once prepared, the rotational derivative of the samples was measured using the above-described procedure with a surface rotation $\Delta n°$ of 2°. The measured rotational derivatives of the 3-D printed samples are shown in FIG. 17A. The data shows that the rotational derivative of both samples is highly correlated with theoretical values.

Figure 17B:
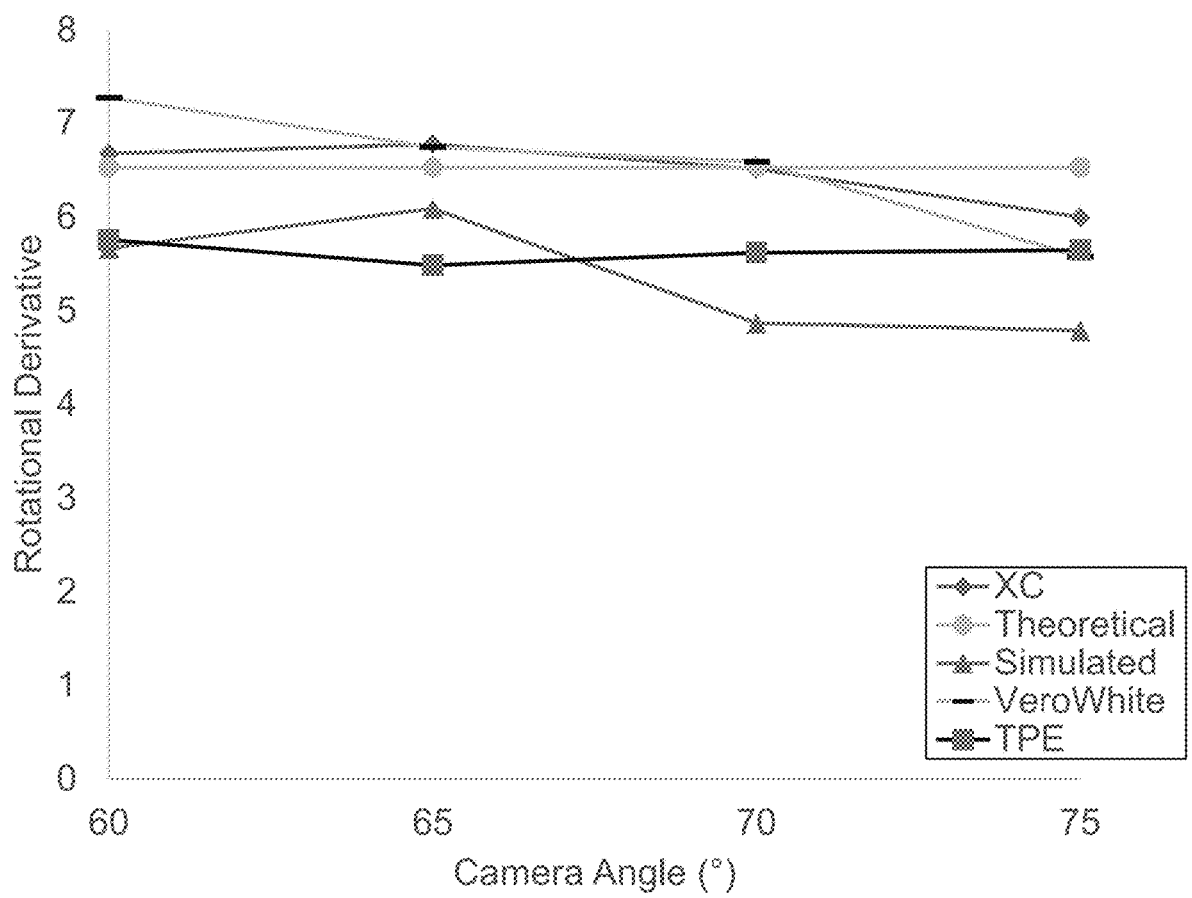

In another analysis depicted by FIG. 17B, samples were created by 3D printing spherical textures having a 1 mm height and width with both a flexible thermoplastic elastomer (TPE) material and a rigid VeroWhite material. The test samples were 4 inches by 4 inches and rotational derivatives were measured using the above-described procedure at an illumination angle of −75°, at viewing angles of 60°, 65°, and 70°, and with a surface rotation $\Delta n°$ of 2°. The results shown in FIG. 17B demonstrate that the measured results are highly correlated to simulated results, as further described below.

Additive Material Array Samples

Figure 18A:
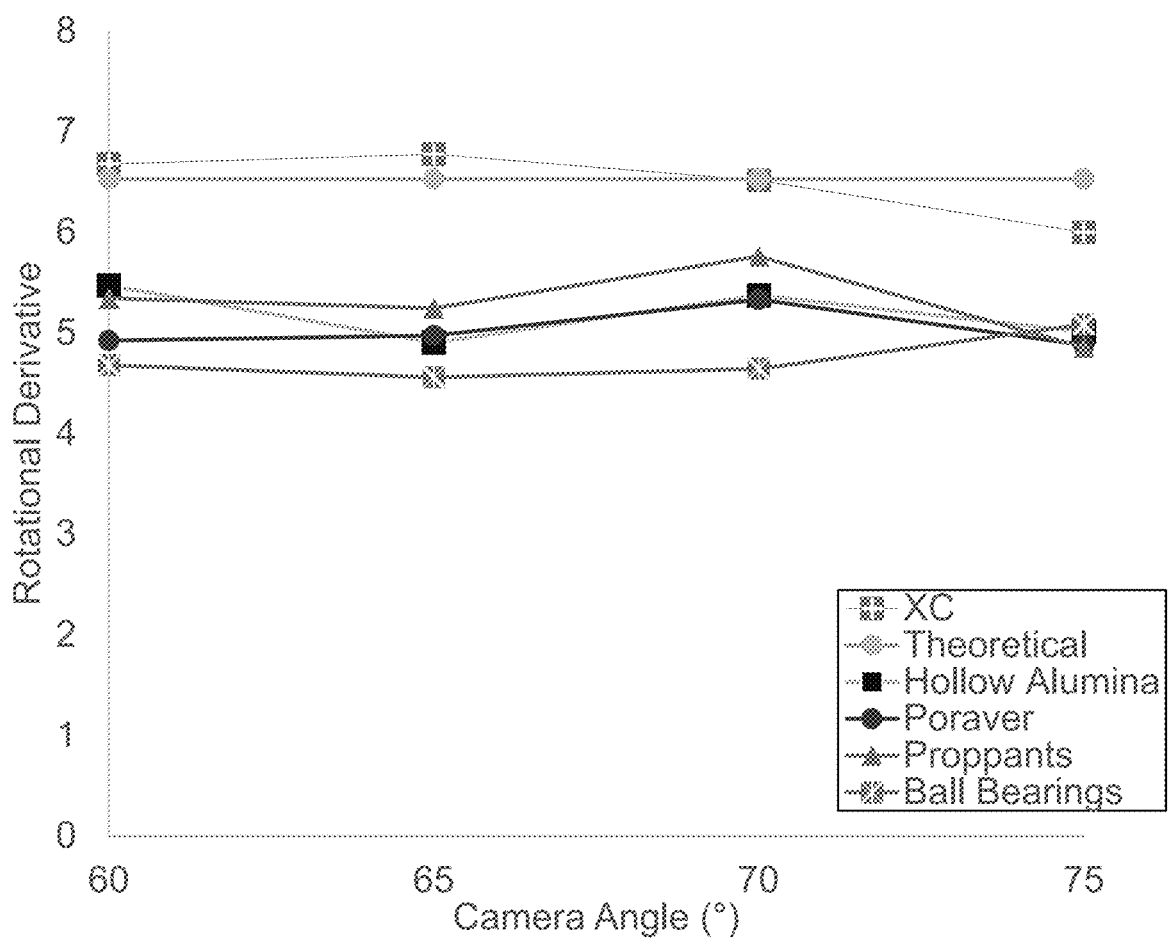
FIGS. 18A and 18B show measured rotational derivatives of material added samples.

Samples with spherical structures of varying size adhered to the visible surface were produced to validate that the rotational derivative of a surface with spherical structures is unaffected by the size of the spherical structures. Samples with surfaces covered with aluminum, steel and glass beads having diameters ranging from 0.04 mm to 7 mm were prepared, and the rotational derivatives of the samples were measured using the above-described process. In particular, samples with glass beads having diameters ranging from 0.04 mm to 0.125 mm, glass beads having diameters ranging from 0.1 mm to 0.5 mm, proppants having diameters ranging from 0.595 mm to 0.845 mm, hollow alumina having diameters ranging from 0.75 mm to 1.5 mm and ball bearings of about 5 mm were prepared, and the rotational derivatives of the samples were measured according to the above-described procedure using a surface rotation $\Delta n°$ of 2°. The resulting data is shown in FIG. 18A and demonstrates that the rotational derivative of surfaces covered with spherical structures are unaffected by the size of the spheres, as expected. Moreover, the measured rotational derivatives of the spherical textures were lower than a theoretical Lambertian surface or the measured value of the colorchecker (XC).

A method was also developed to produce surfaces in a manner convenient for manufacturing. Various gypsum panels were coated with a formulation that included spherical beads in a mixture. The coating formulation included 20-50 g spherical beads per 100 mL paint or primer, and 15 mL paint thinner or water. This formulation resulted in a viscosity of between 50-500 cps, which allowed the formulation to withstand high stress during spraying and prevent clogging. The spherical materials tested included Poraver glass beads (4-500 μm), ASTM sand (0.75-1.5 mm), proppants (1-4 mm). Of various different particle types, Poraver glass beads (4-125 μm) demonstrated an ability to avoid aggregating during the mixing and spraying process.

The spraying equipment used was also important to produce the spherical surface texture and prevent clogging. An electric Wagner control sprayer and gravity-fed compressed air Neiko sprayer were able to reliably and reproducibly produce a hiding texture over a 4 ft by 4 ft gypsum piece. Moreover, a circular orifice nozzle with a 1:1 aspect ratio with a diameter of at least 1.5 mm also aided in producing a desirable texture and avoiding clogging compared to an ellipsoidal orifice.

To create the samples, the texture was sprayed from a Wagner electric sprayer with the spray nozzle at 12 in away from and perpendicular to the underlying gypsum piece. The gypsum was sprayed with one spray pass, two passes, and three passes to understand the constraints of the spraying conditions to produce a spherical texture with hiding ability.

Figure 18B:
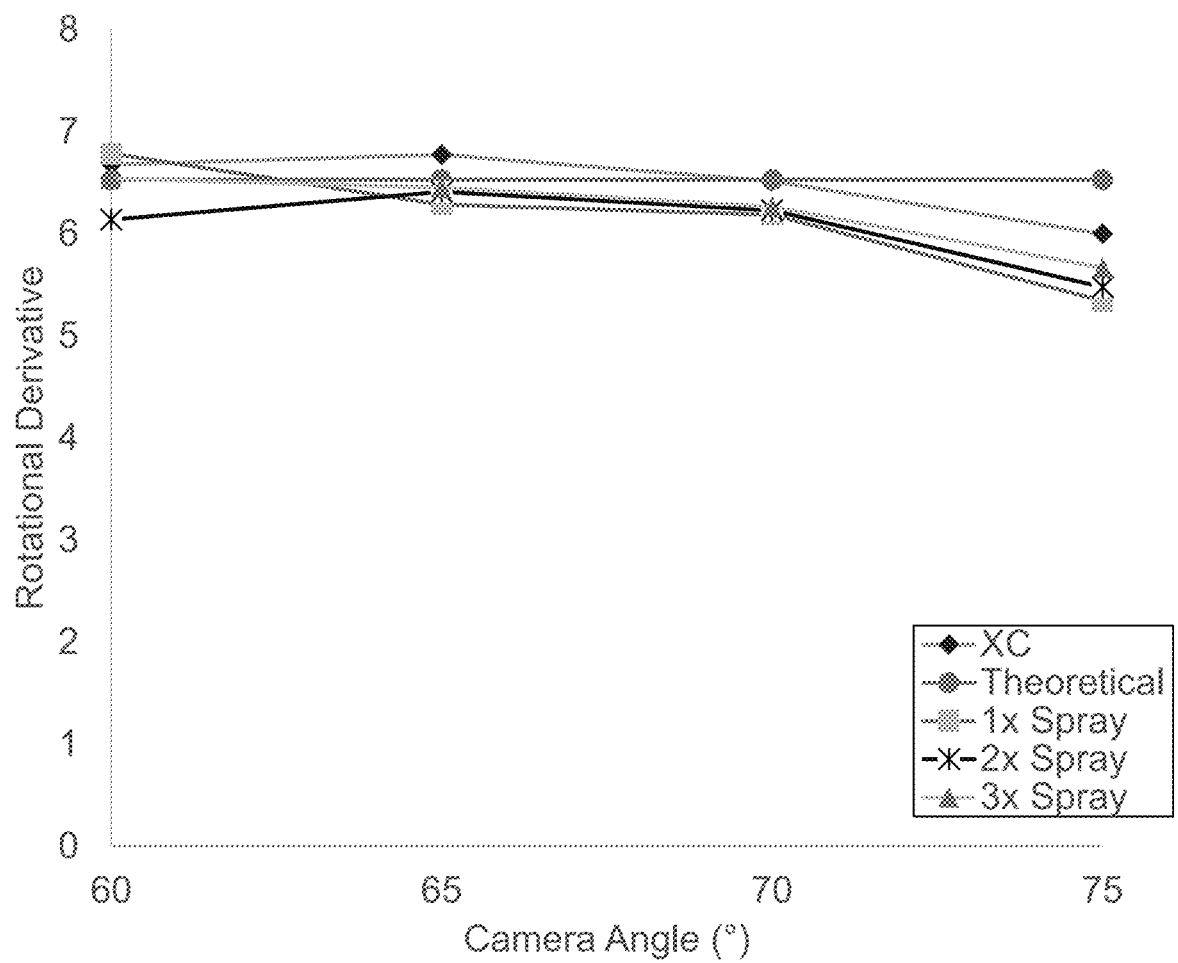

Rotational derivatives of the samples were measured using the above-described process using a surface rotation $\Delta n°$ of 2°, and the resulting data is shown in FIG. 18B. As shown, the samples produced by the foregoing spraying method produced surfaces having rotational derivatives on par with the theoretical Lambertian surface.

Example Investigations in Virtual Environment

Figure 19:
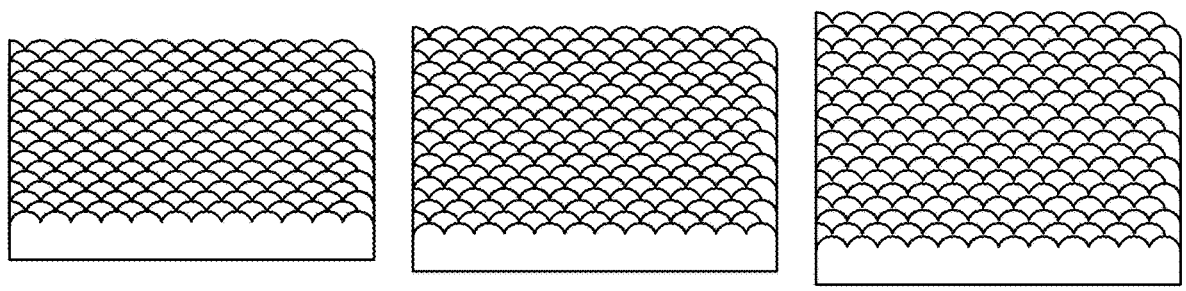
FIG. 19 is a schematic depiction of the rotated samples of a textured surface from the perspective of a stationary camera.

A series of investigations were conducted in a virtual environment to measure the rotational derivative of various surface textures through a range of viewing directions and illumination angles. Similar to the experimental setup of the physical environment, the experimental setup of the virtual environment is also shown in FIG. 15. Light sources were positioned at −80, −75, −70, −65, −60 and −45° from the surface normal n. Each of the light sources were individually illuminated and images were captured by 65 cameras in a range of viewing directions $\omega_o$ at viewing angles $\theta_o$ ranging from −80° to 80° from the surface normal. To calculate the rotational derivative the samples were imaged in a neutral position, rotated by 2° in the positive direction, and rotated by two° in the negative direction. FIG. 19 is a schematic depiction of the rotated samples of a textured surface from the perspective of a stationary camera. The surface in the center is neutrally positioned, the surface on the left is rotated 2° away from the camera, and the surface on the right is rotated 2° toward the camera.

Figure 20:
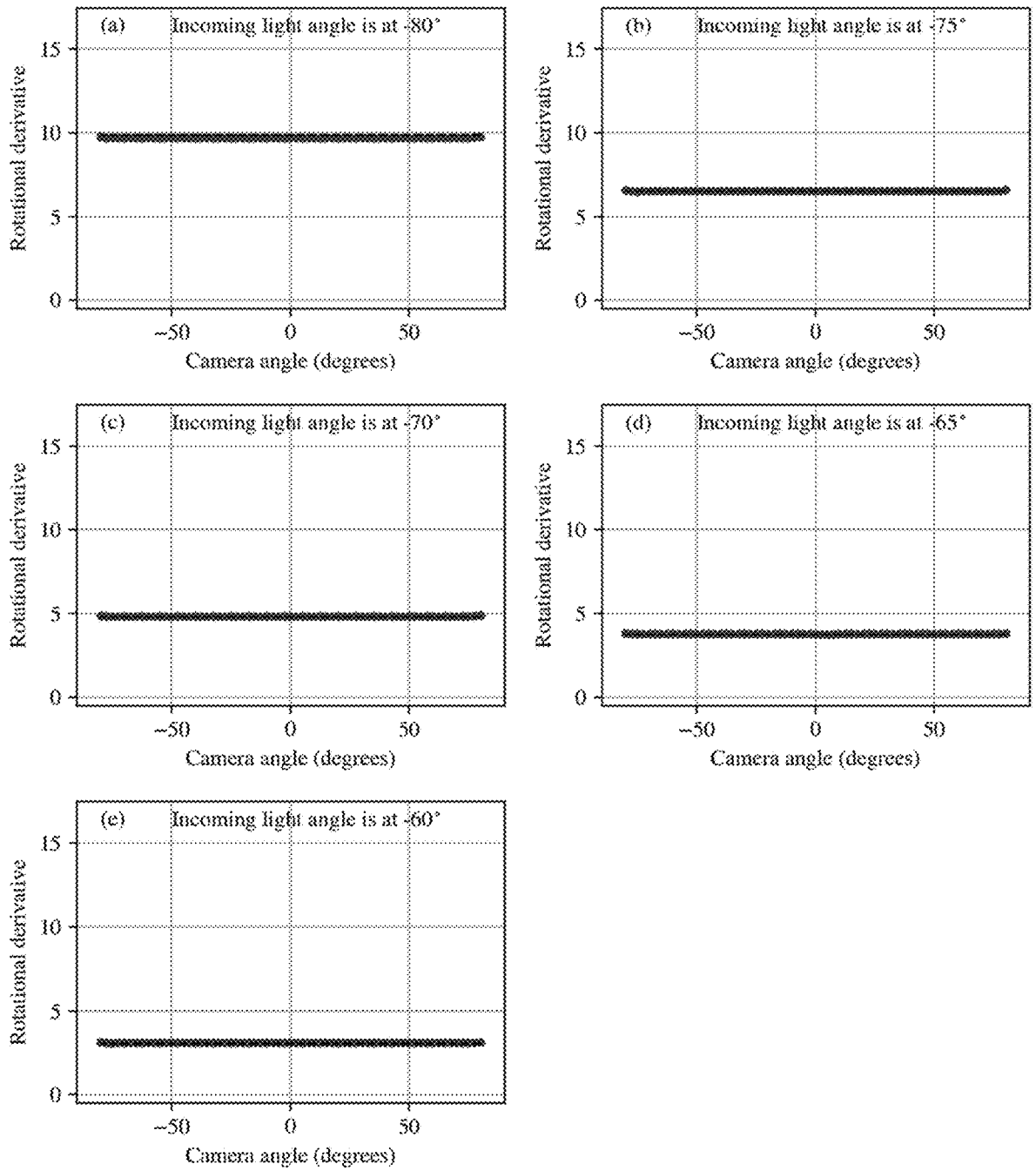
FIG. 20 shows measured and theoretical values of the rotational derivative of a surface at various illumination angles.

The experiments were validated by comparing the measured rotational derivative of a Lambertian surface to a known calculated rotational derivative according to Lambert's theory. The measured values for a range of viewing angles at five of the above-listed illumination directions are depicted in FIG. 20, which shows that the measured data matched the calculated values.

The experiments conducted in the virtual environment used a variety of different types of textures including spherical structures, cylindrical structures, wavy surfaces, bumpy surfaces, cavity structures and pyramid structures, as explained in more detail below. To simplify fabrication, the dimensions of the surfaces were enlarged in the experiments. However, the overall interaction of the surface with light will be unaffected by size, so long as the dimensions of the surface features are larger than the wavelength of the light source.

Figure 21:
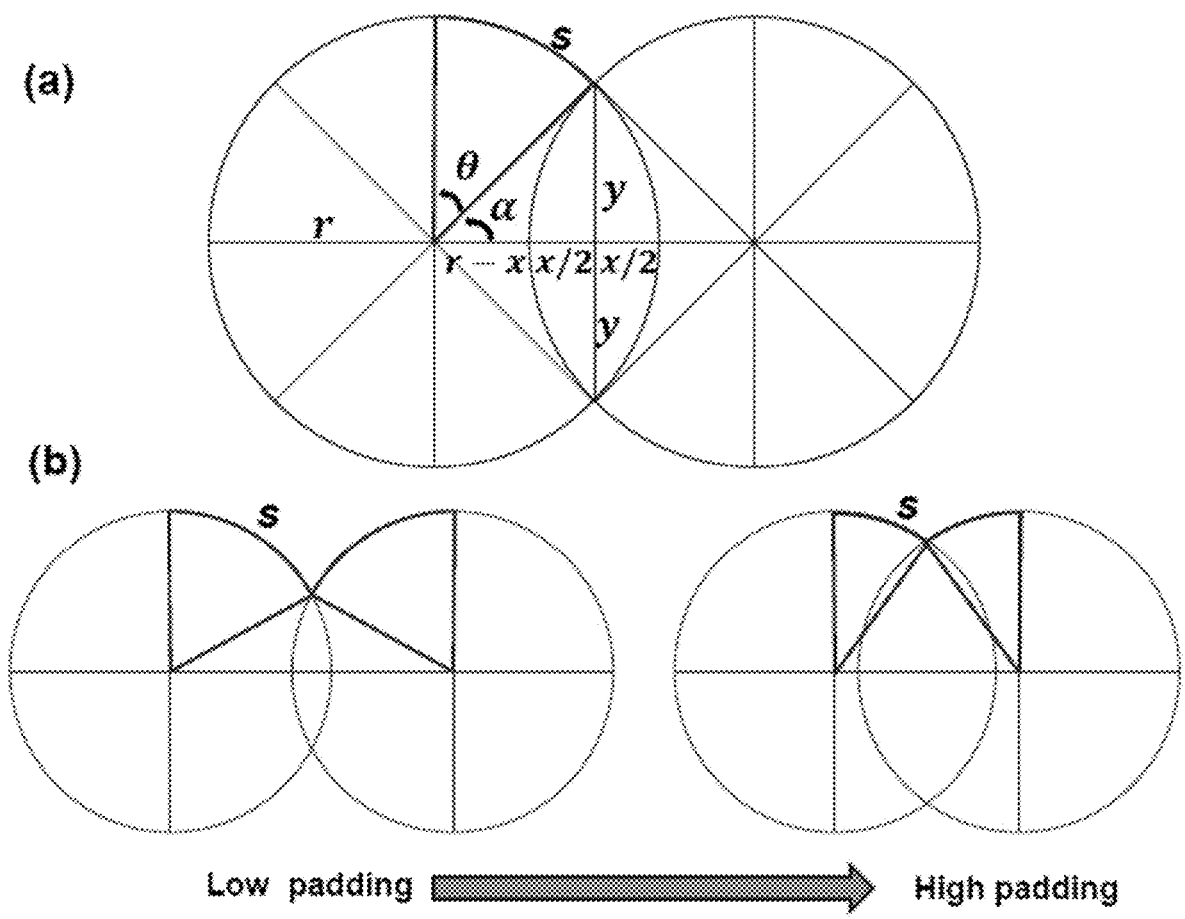
FIG. 21 is a schematic depiction of the padding of spherical structures forming a textured surface.
Figure 22:
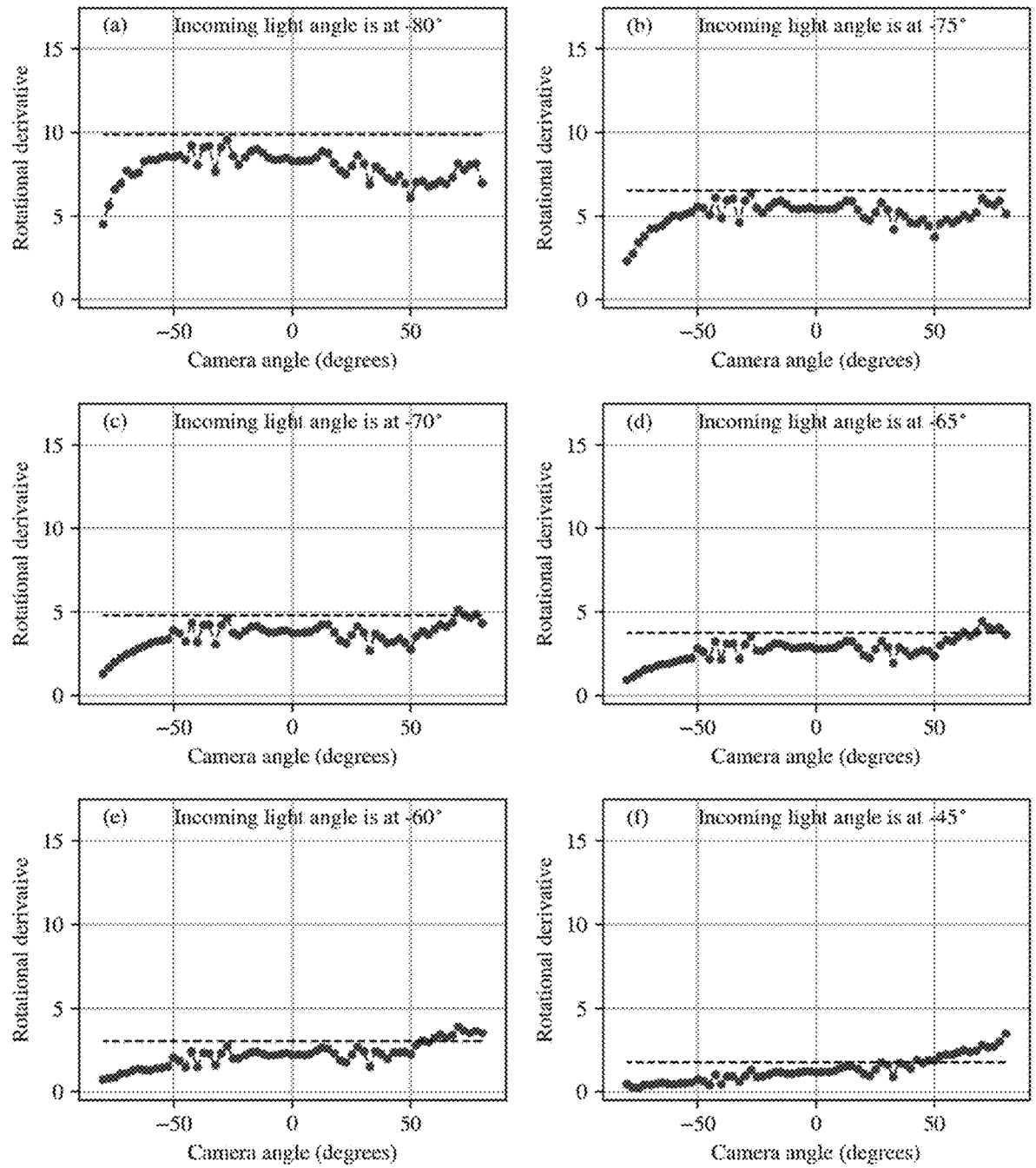
FIGS. 22-27 show measured rotational derivatives for surfaces with overlapping spherical structures.
Figure 23:
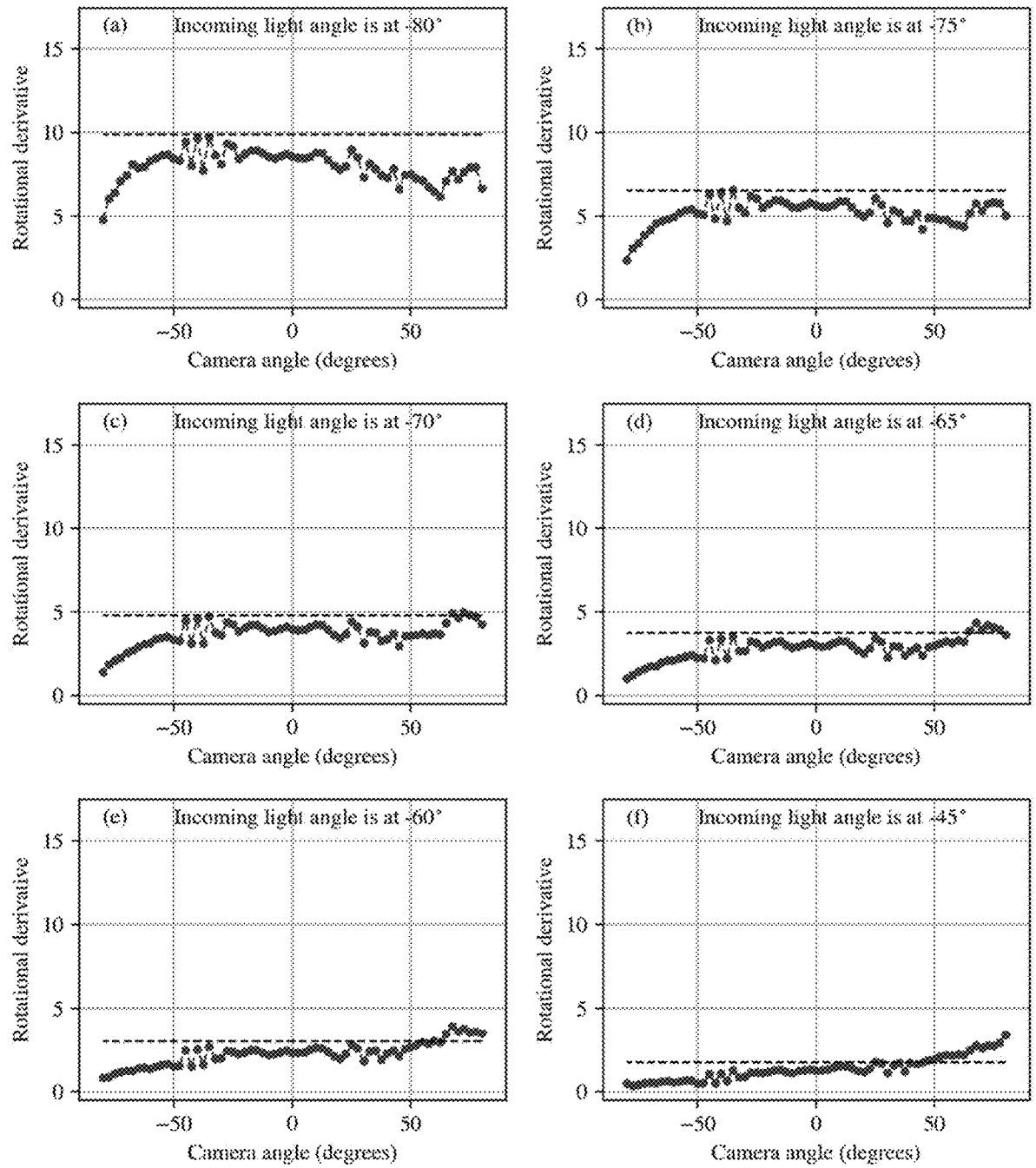
Figure 24:
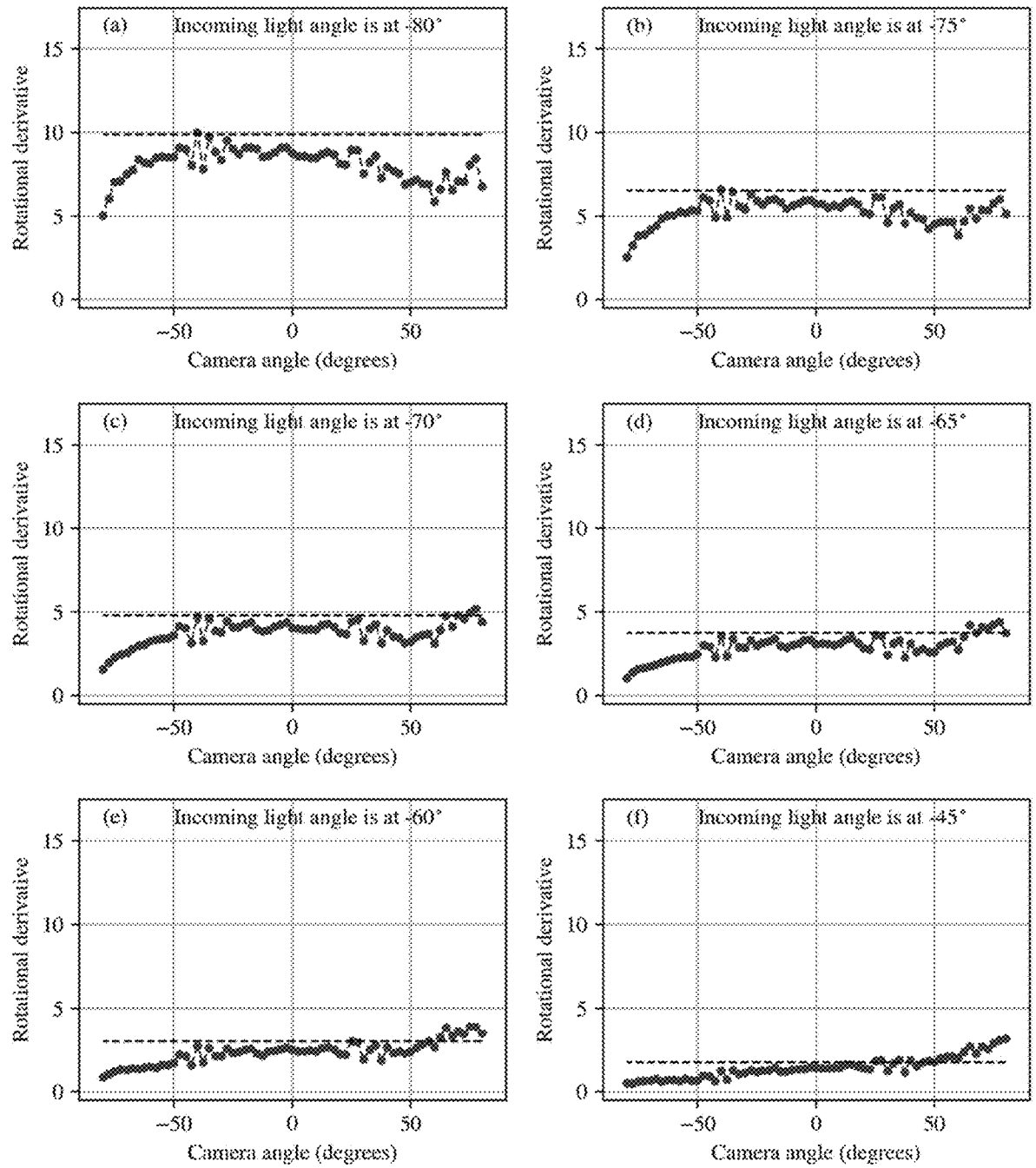
Figure 25:
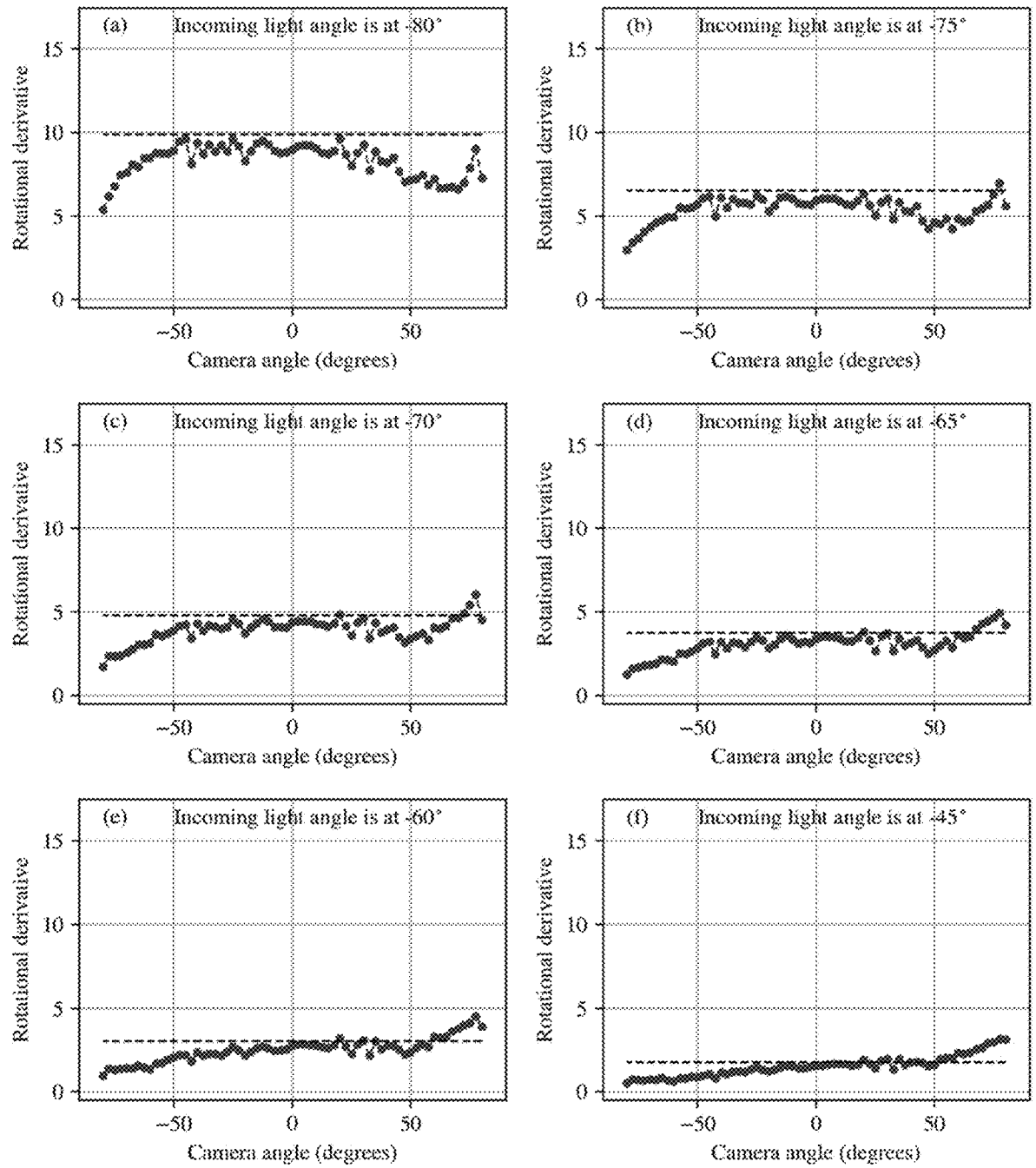
Figure 26:
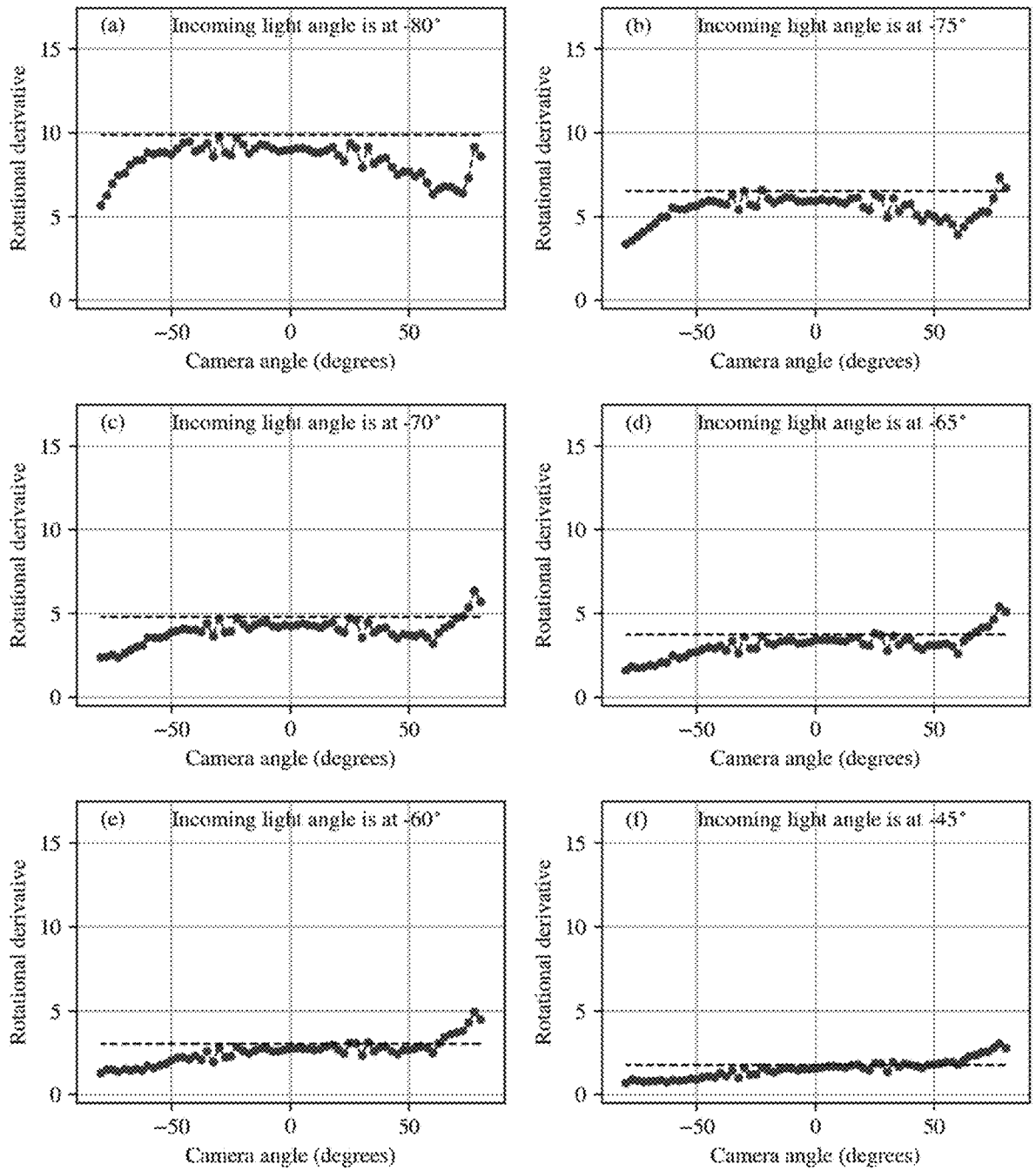
Figure 27:
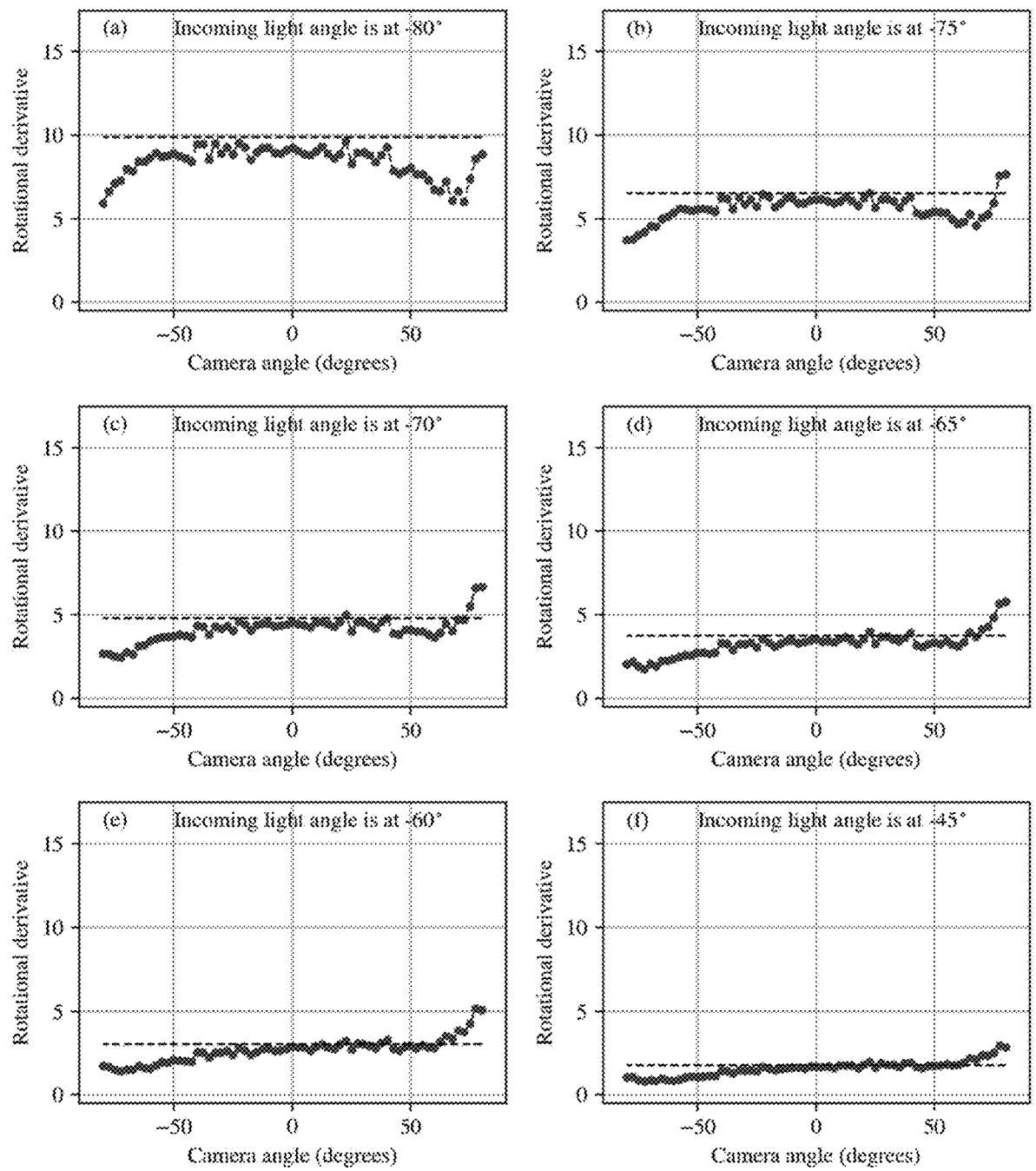
Figure 28:
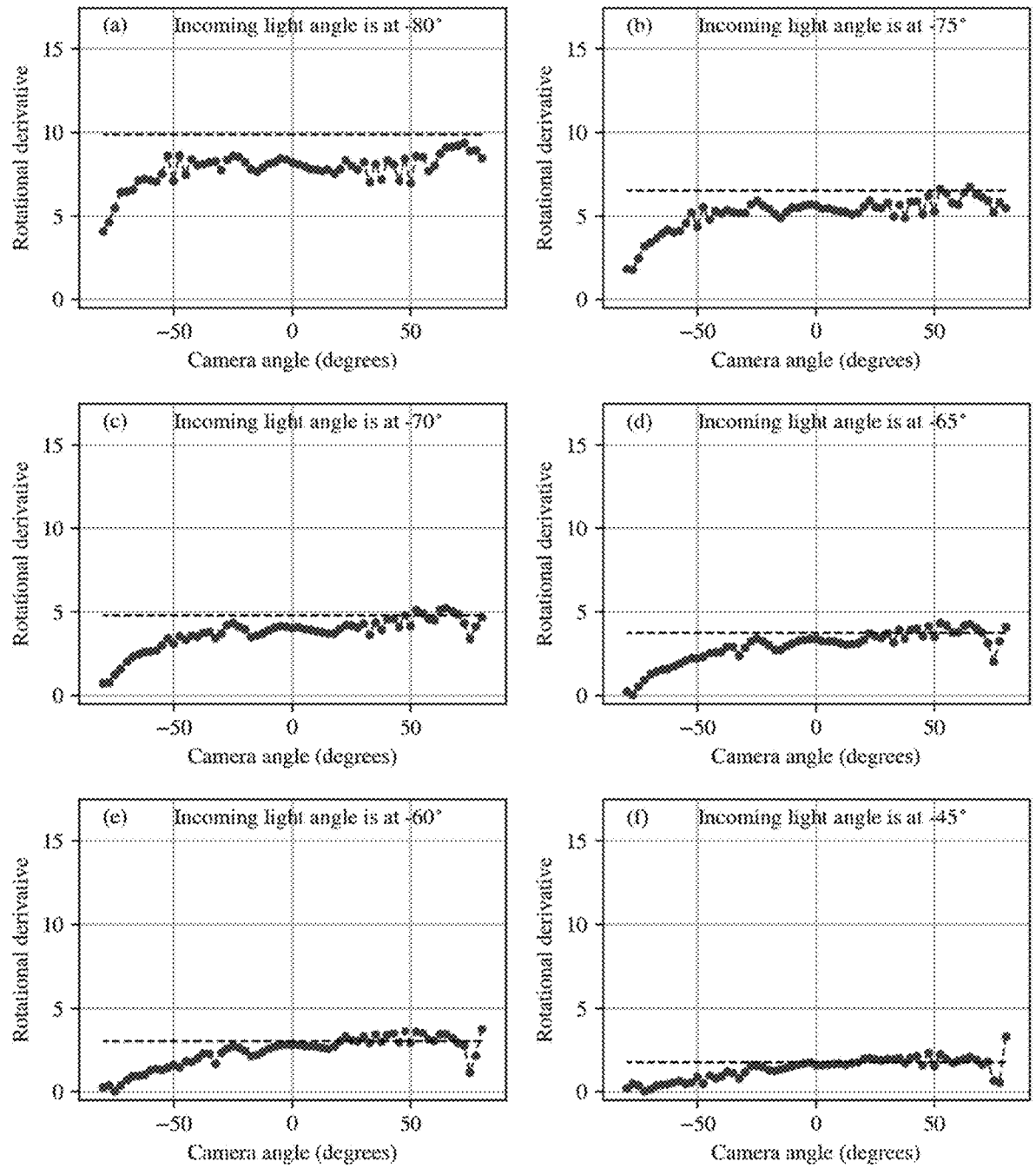
FIGS. 28-32 show measured rotational derivatives for surfaces with spaced spherical structures.
Figure 29:
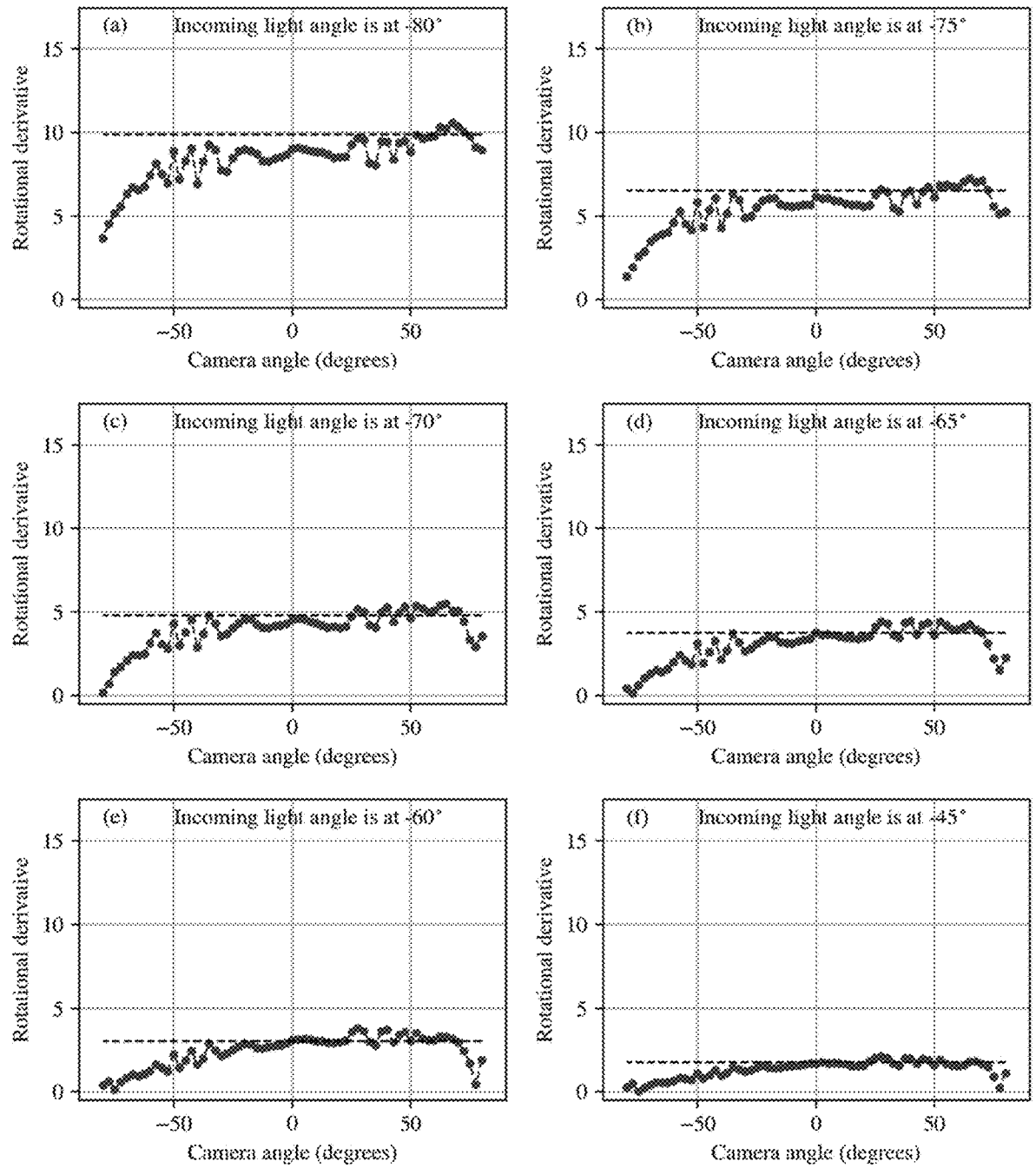
Figure 30:
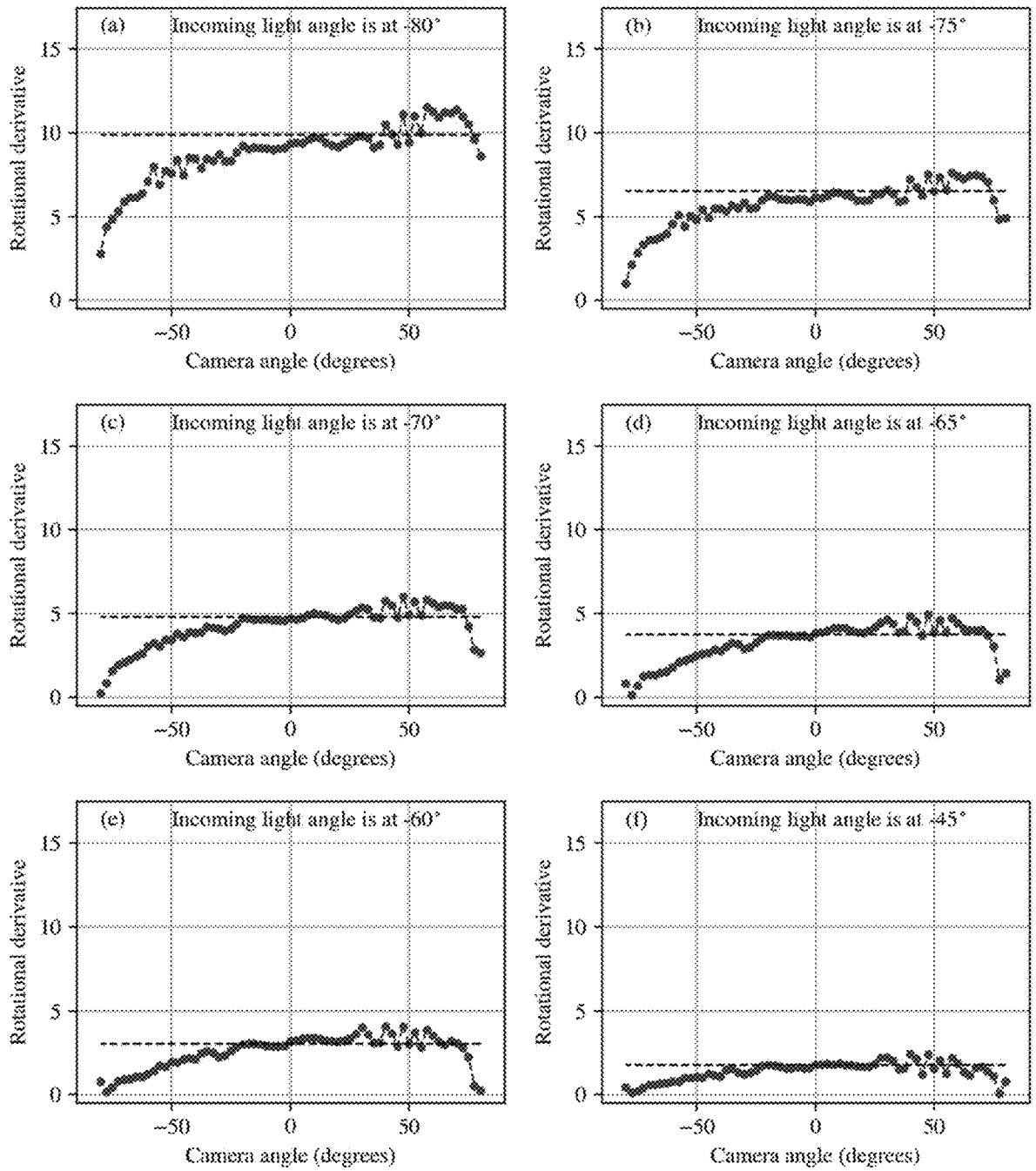
Figure 31:
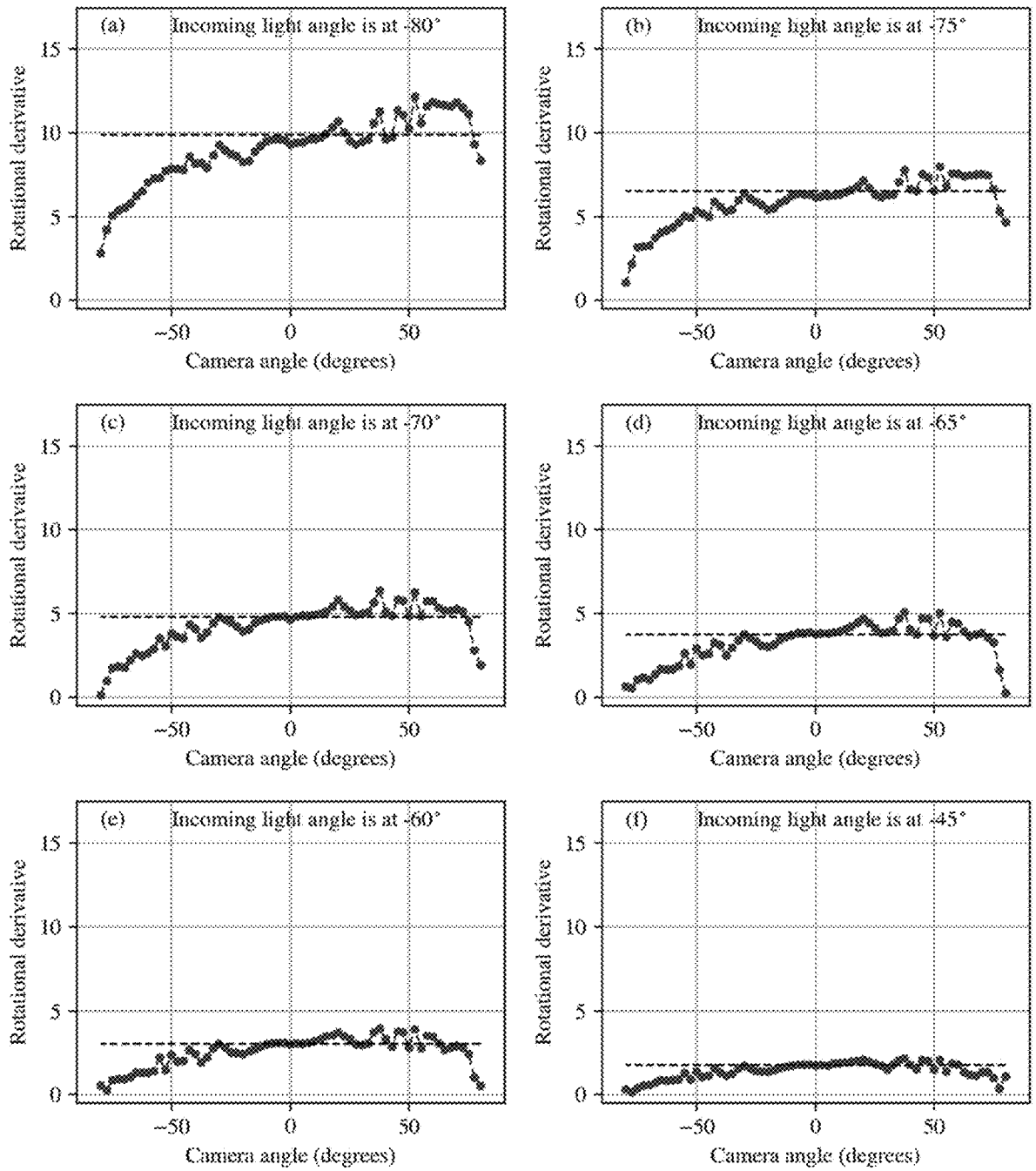
Figure 32:
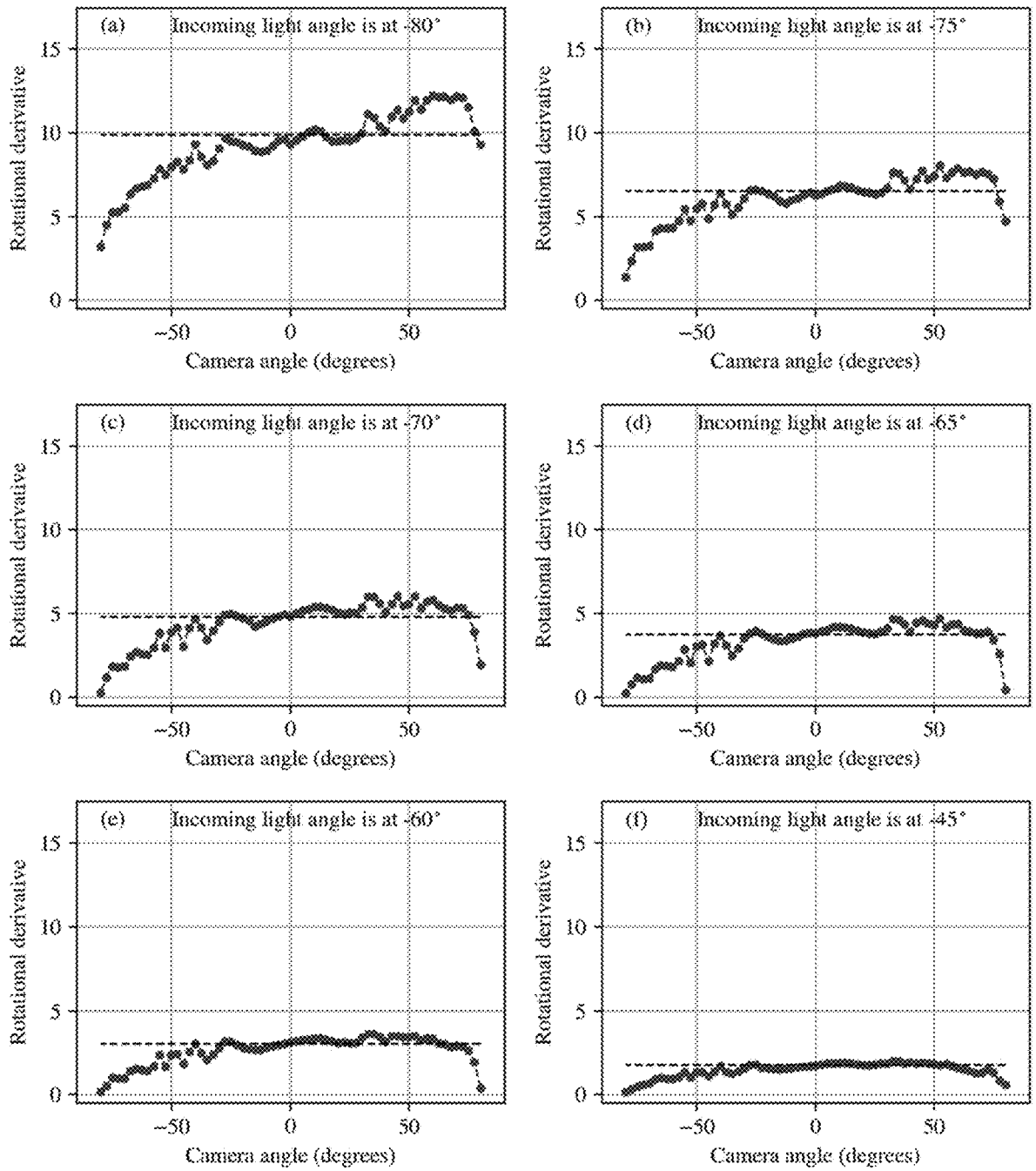

Rotational derivatives were measured for eleven different surfaces covered with spherical structures having a radius of 0.5 inches. Each of the eleven surfaces includes hemispherical features projecting from the surface. The surfaces differ in the distance between, or overlap of, the spherical structures. In particular, the distance from one spherical structure to the next is defined by a padding value, which is the distance along a line between the centers of the two structures that one spherical structure overlaps a neighboring structure, or that one spherical structure is spaced from a neighboring structure. The padding of the spherical structures is depicted in FIG. 21, which demonstrates that higher padding forms a surface with more tightly packed spherical structures.

FIGS. 22-27 depict measured rotational derivatives for surfaces with spherical structures that overlap one another. The amount of overlap of the spherical structures grows progressively from FIG. 22 to FIG. 27, with respective overlap amounts of 20% (0.20 inches), 25% (0.25 inches), 31% (0.31 inches), 37% (0.37 inches), 43% (0.43 inches), and 50% (0.50 inches). The experimental results show that all six surfaces had a comparable or lower rotational derivative than a Lambertian surface for all viewing directions at grazing illumination angles, where the illuminating light was at an angle of −80°, −75°, and −70° from the surface normal. At higher illumination angles of −65°, −60°, and −45° the rotational derivative rose above that of the Lambertian surface at grazing viewing angles above approximately 70° from the surface normal.

FIGS. 28-32 depict measured rotational derivatives for surfaces with spherical structures that are spaced from one another. The amount of spacing between the spherical structures, as a percentage of the spherical structure diameter, grows progressively from FIG. 28 to FIG. 32, with respective spacing of 10% (0.10 inches), 20% (0.20 inches), 31% (0.31 inches), 43% (0.43 inches), and 50% (0.50 inches). The experimental results of the spaced apart spherical structures show that the spherical structures with a slight spacing of 10% or 20% had a comparable or lower rotational derivative than a Lambertian surface for all viewing directions at all six measured lighting angles. The surfaces with the larger spacing of 31%, 43% and 50% had a slightly higher rotational derivative than the Lambertian surface under grazing lighting conditions. Unlike the surfaces with overlapping spherical structures, all of the surfaces with spaced apart spherical structures had comparable or lower rotational derivatives at the higher illumination angles of −65°, −60°, and −45° from the surface normal.

Figure 33:
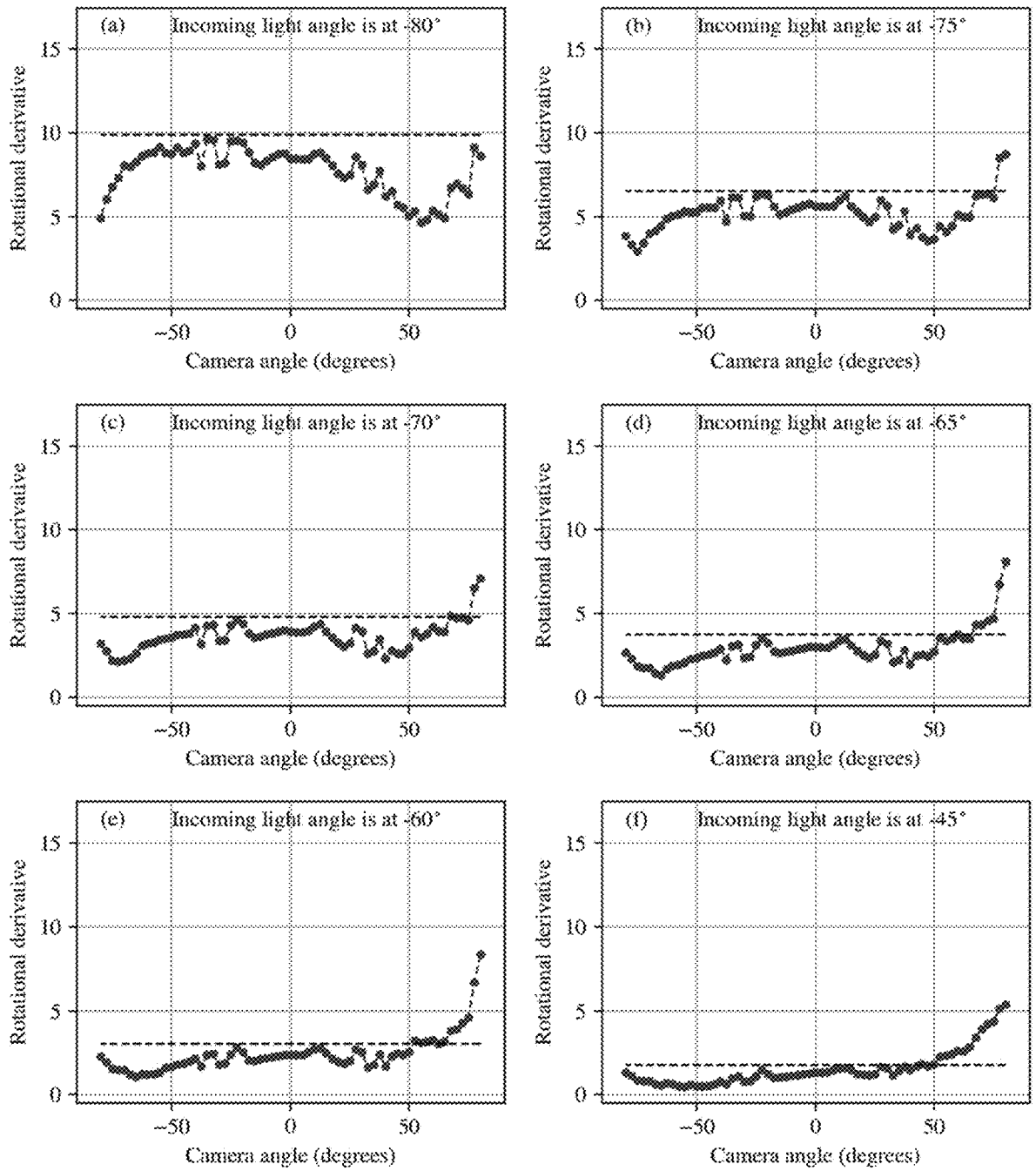
FIGS. 33-35 show measured rotational derivatives for surfaces with cylindrical structures.
Figure 34:
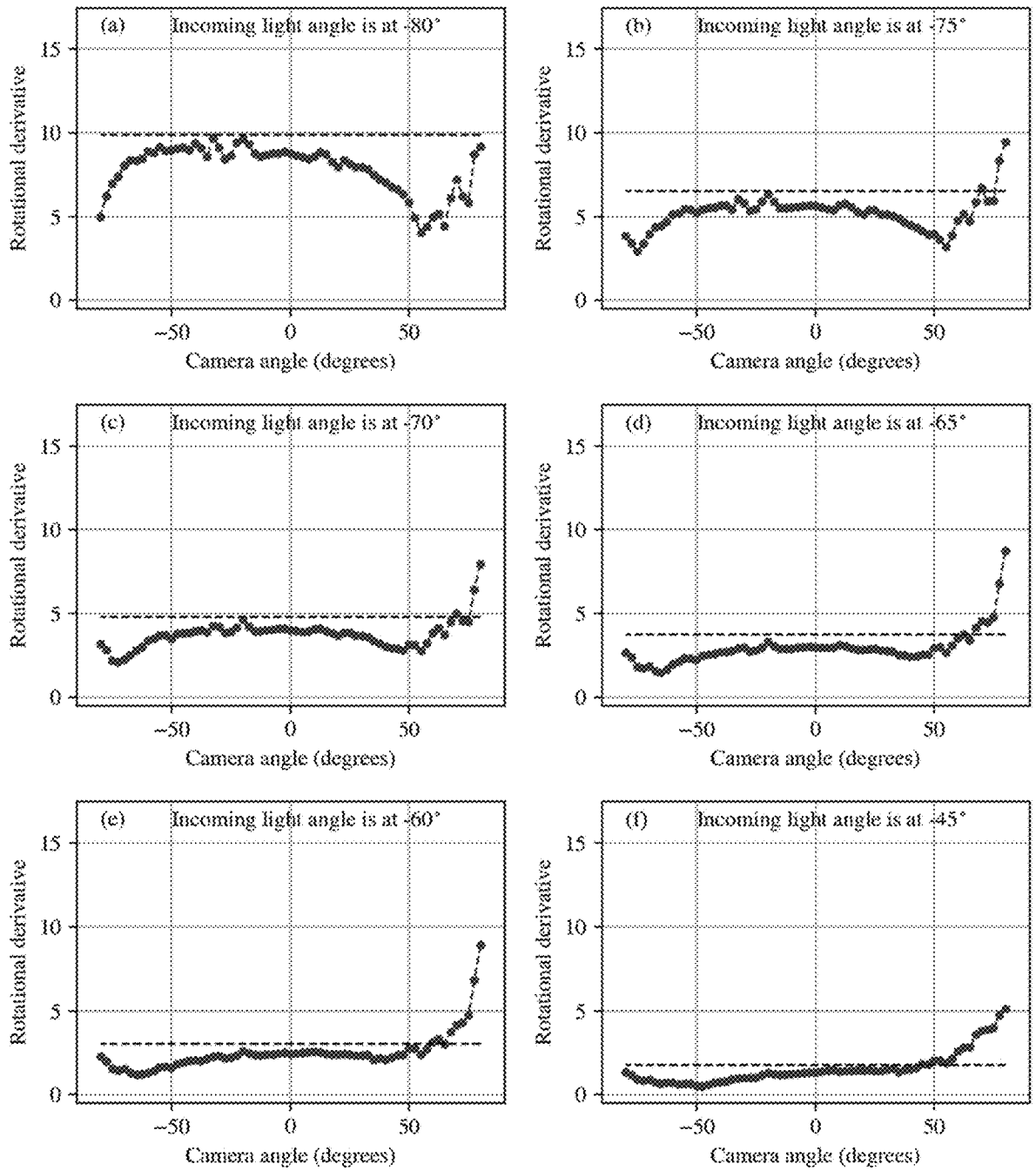
Figure 35:
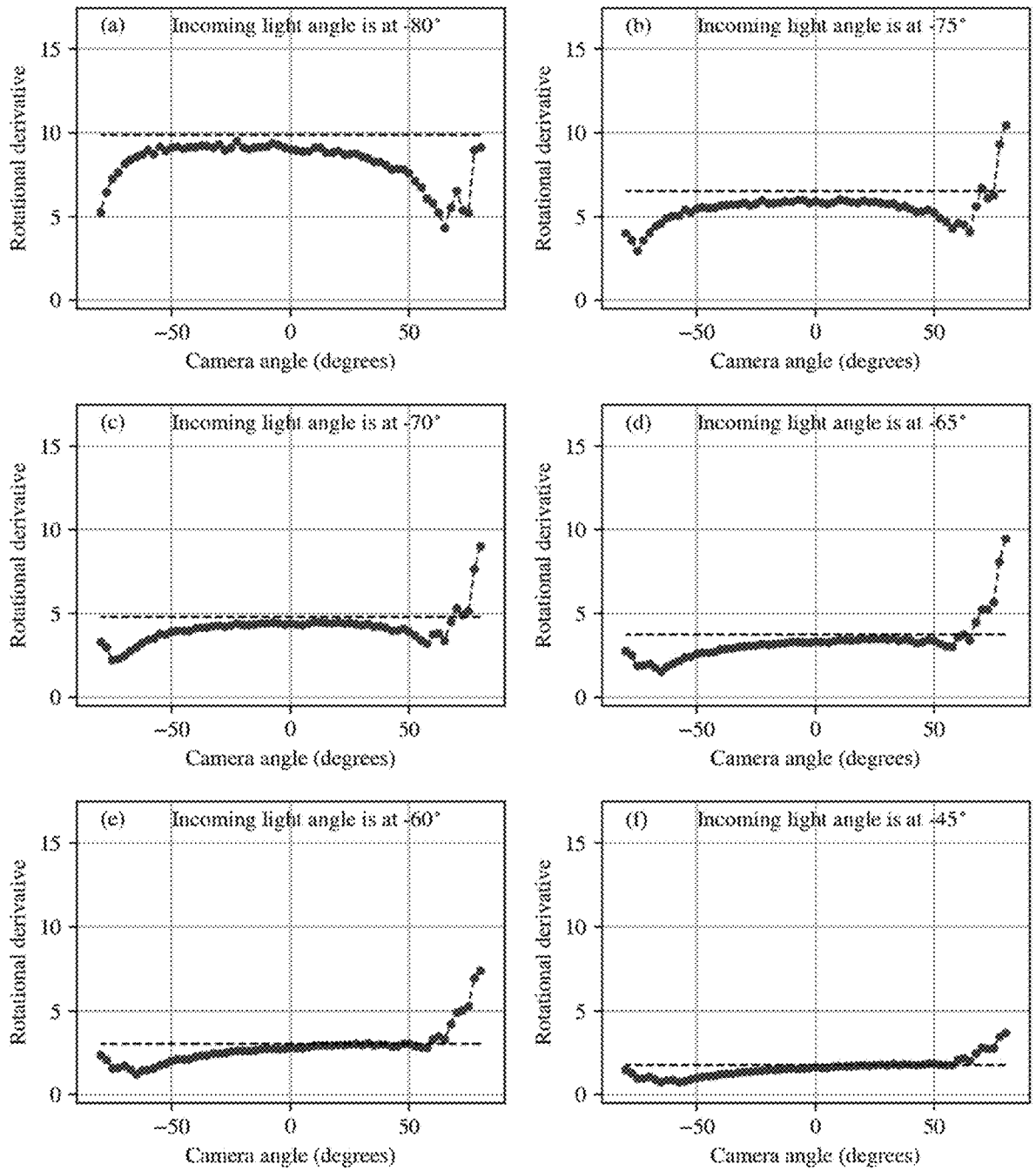

Rotational derivatives were also measured for three different surfaces covered with cylindrical structures. FIGS. 33-35 depict measured rotational derivatives for surfaces with cylindrical structures having a radius of 0.5 inches that are adjacent or overlap one another. The cylindrical structures are positioned with their respective axes aligned with the surface, and the overlap is measured with respect to a line between the radial centers of the cylindrical structures. The amount of overlap of the spherical structures grows progressively from FIGS. 33 to 35, starting with no overlap, 6% overlap (0.06 inches) and 31% (0.31 inches). The experimental results of the surfaces with cylindrical structures show rotational derivatives that are below those of a Lambertian surface for all viewing directions under the most grazing lighting condition of an illumination angle of −80° from the surface normal. However, under other lighting conditions, the rotational derivative rises above that of the Lambertian surface for grazing viewing angles at approximately 70° from the surface normal.

Figure 36:
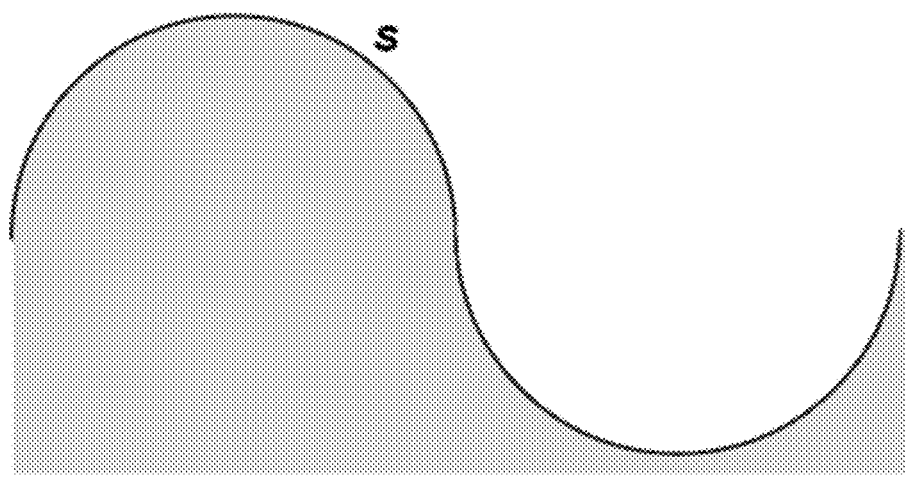
FIG. 36 is a schematic depiction of a portion of a textured surface with a wavy structure.
Figure 37:
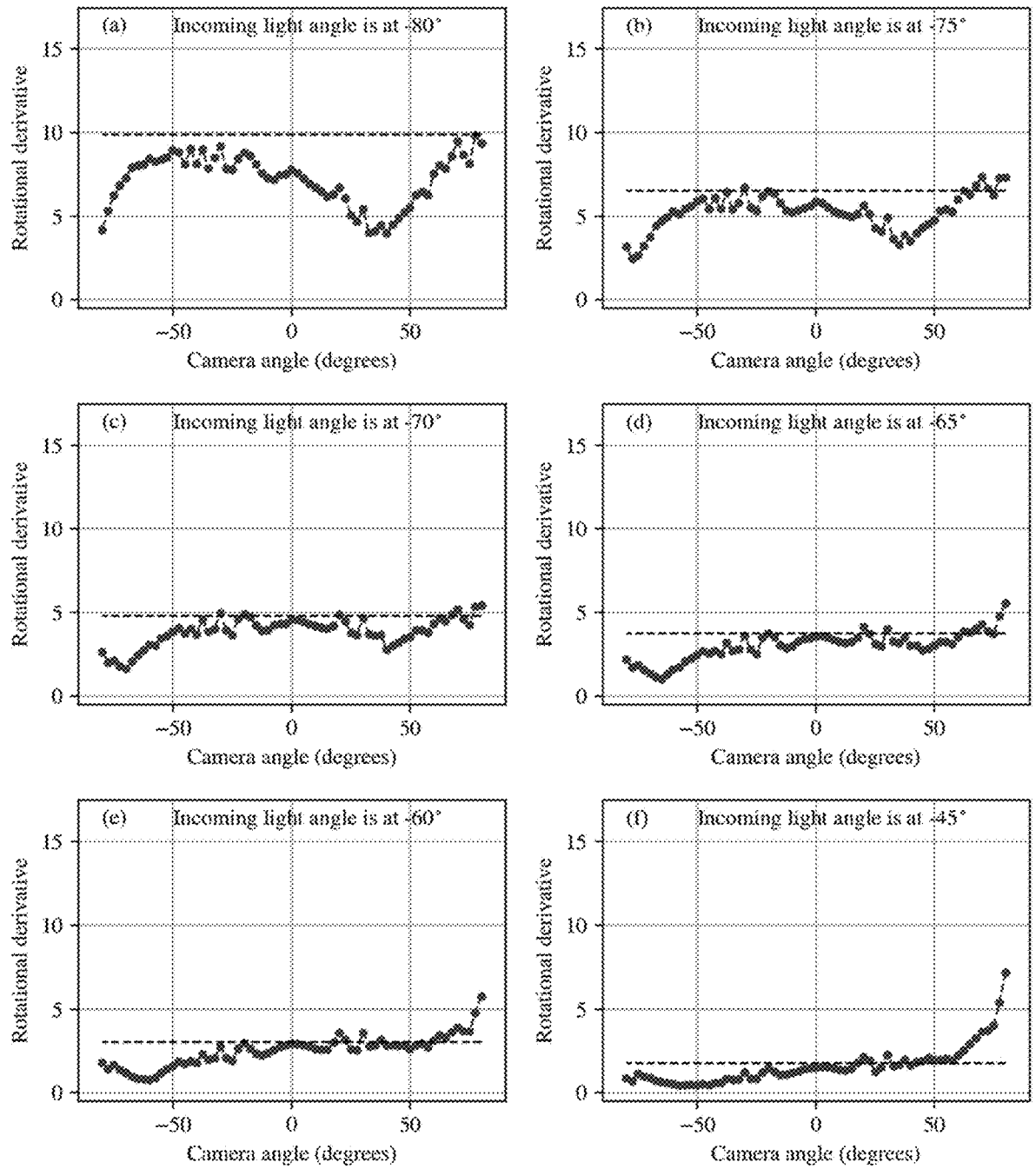
FIG. 37 shows measured rotational derivatives for surfaces with a wavy structure.

Rotational derivatives were also measured for a wavy structure including convex and concave cylindrical structures, each having a diameter of 0.35 inches. A schematic cross section of the wavy structure is shown in FIG. 36. The measured rotational derivatives for six different lighting angles over a range of viewing directions are presented in FIG. 37. As shown, under grazing lighting conditions with illumination angles of −80°, −75° and −70°, the rotational derivative was comparable or below the rotational derivative of the Lambertian surface for all viewing directions. At higher viewing angles, the rotational derivative increased above Lambertian at grazing viewing angles of approximately 70° or higher.

Figure 38:
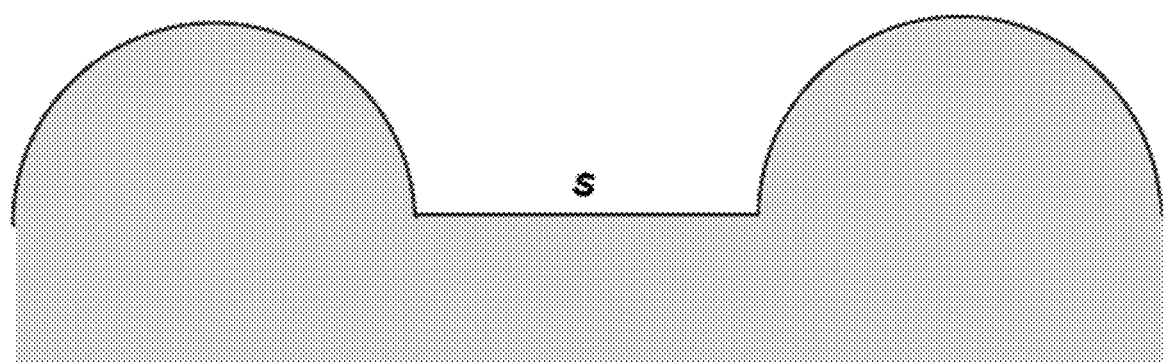
FIG. 38 is a schematic depiction of a portion of a textured surface with a bumpy surface.
Figure 39:
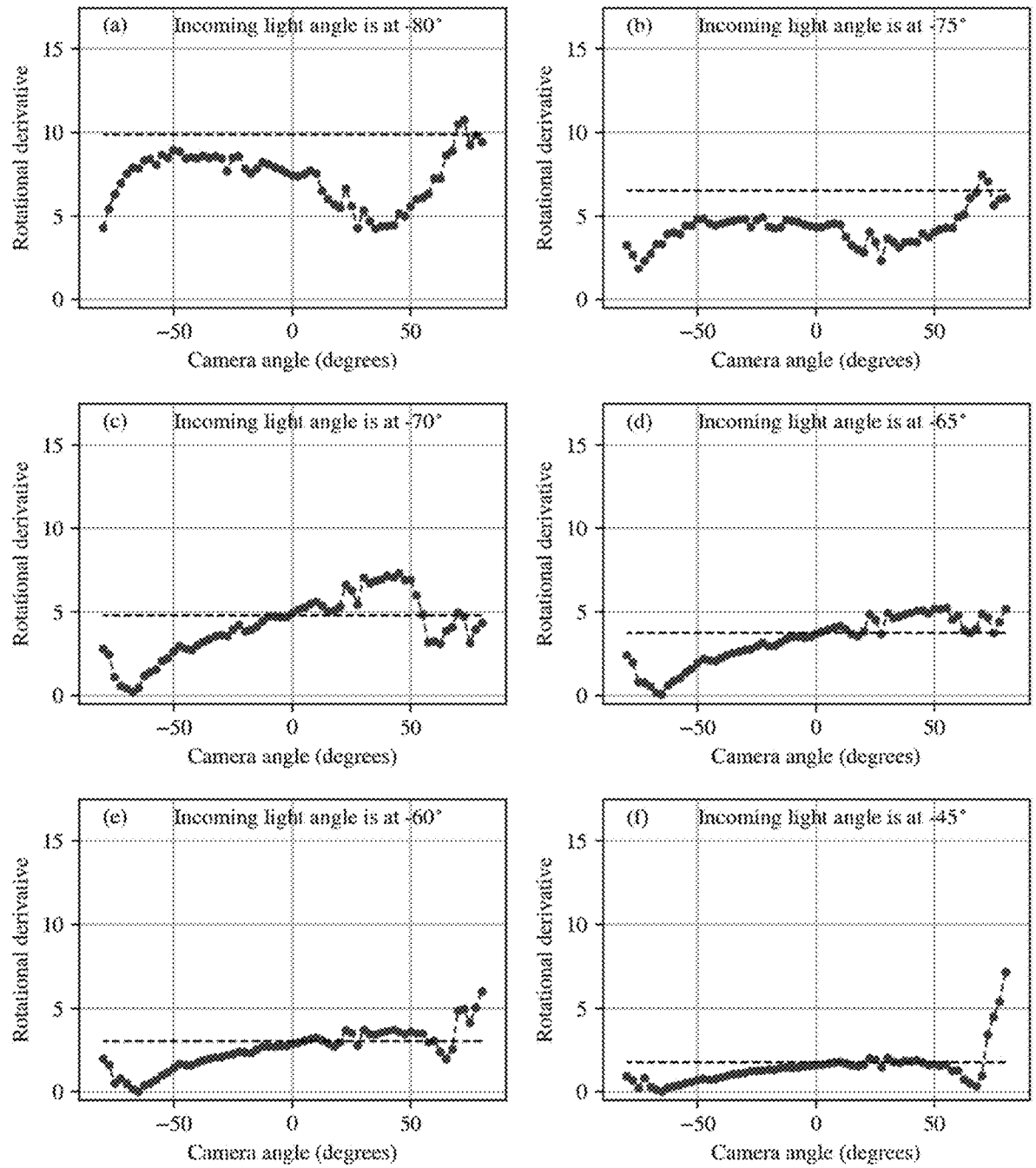
FIG. 39 shows measured rotational derivatives for surfaces with a bumpy surface.

Rotational derivatives were also measured for a bumpy surface, with cylindrical structures having a diameter of 0.3 inches separated by a spacing of 83% (0.25 inches). A schematic cross section of the bumpy structure is shown in FIG. 38. The measured rotational derivatives for six different lighting angles over a range of viewing directions are presented in FIG. 39. Under high grazing lighting conditions with illumination angles of −80° and −75°, the rotational derivative was comparable or below the rotational derivative of the Lambertian surface for all viewing directions. At higher viewing angles, the rotational derivative increased above the values of a Lambertian surface.

Figure 40:
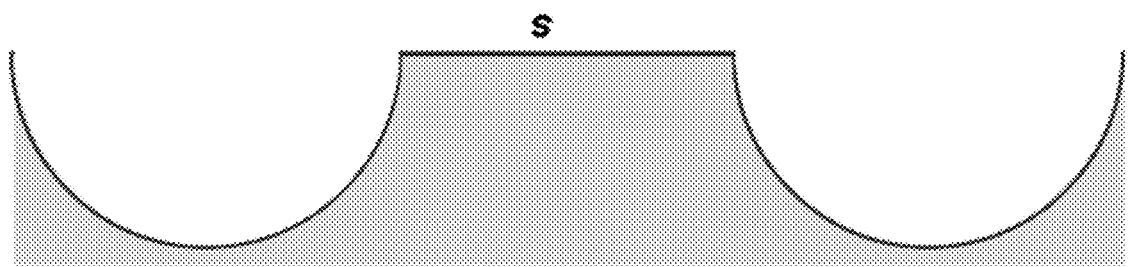
FIG. 40 is a schematic depiction of a portion of a textured surface with cylindrical cavities.
Figure 41:
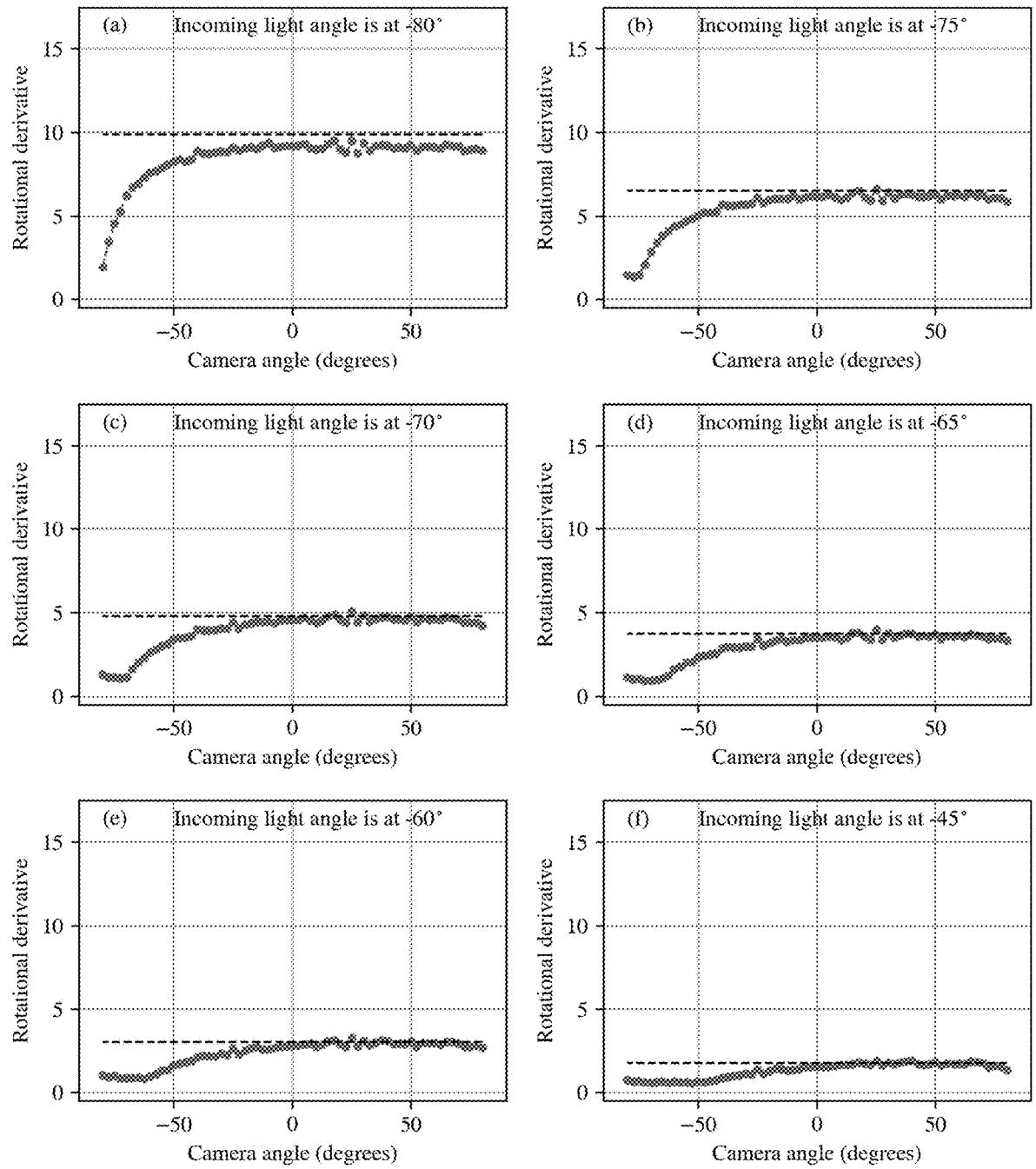
FIG. 41 shows measured rotational derivatives for surfaces with cylindrical cavities.

Rotational derivatives were also measured for a surface including cylindrical cavities having a diameter of 0.3 inches separated by a spacing of 83% (0.25 inches). A schematic cross section of the surface including cavities is shown in FIG. 40. The measured rotational derivatives for six different lighting angles over a range of viewing directions are presented in FIG. 41. Under all six lighting conditions the rotational derivative was comparable or below the rotational derivative of the Lambertian surface for all viewing directions.

Figure 42:
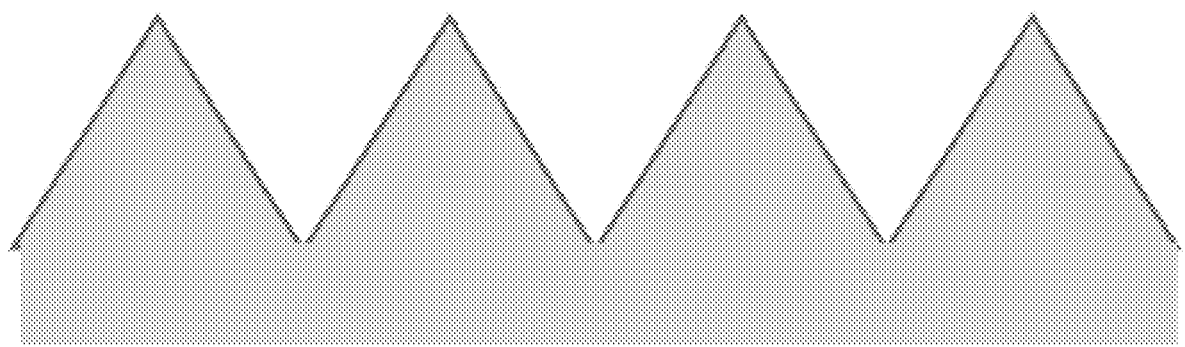
FIG. 42 is a schematic depiction of a portion of a textured surface with pyramid structures.
Figure 43:
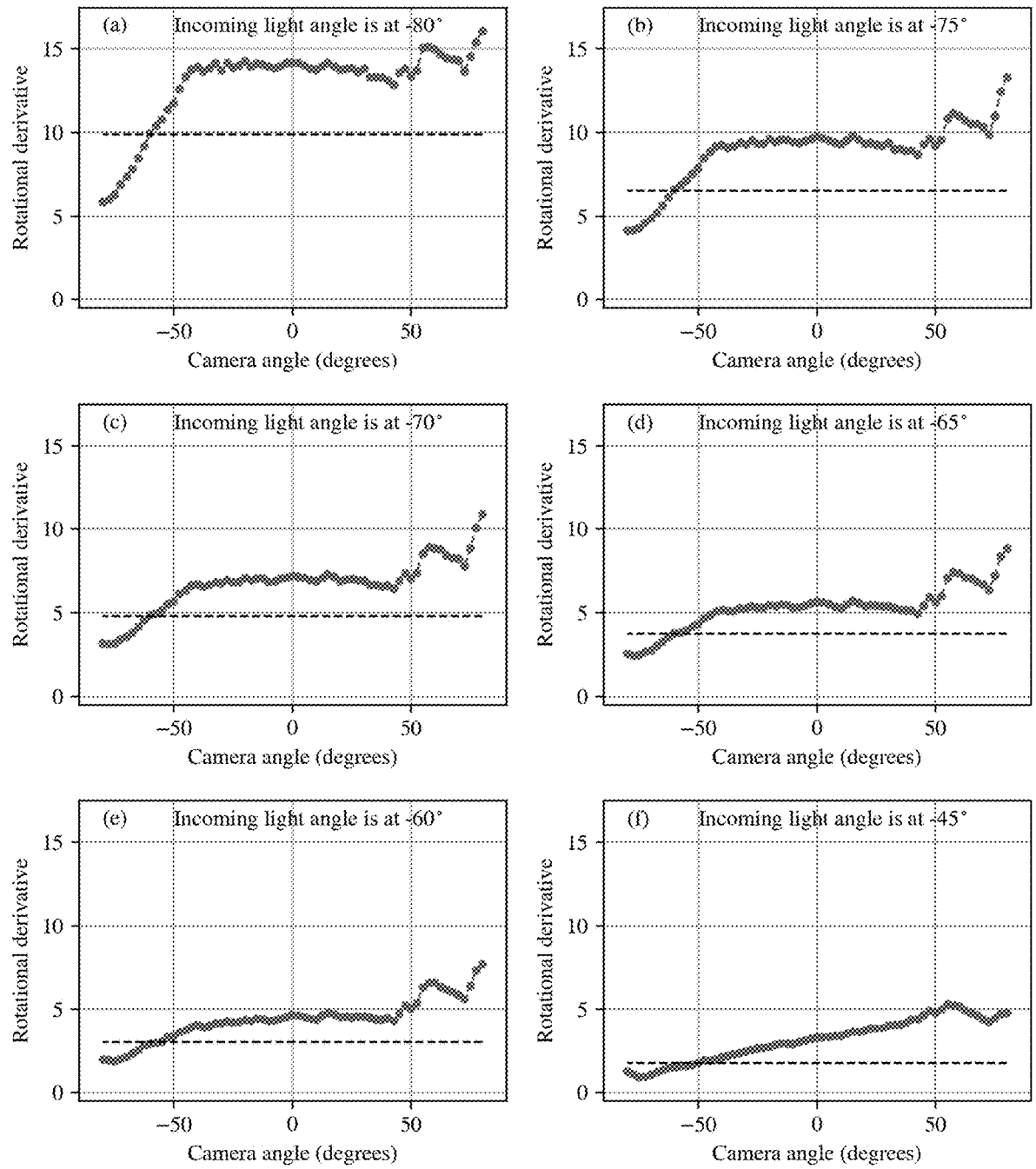
FIG. 43 shows measured rotational derivatives for surfaces with a pyramid structures.

Rotational derivatives were also measured for a surface including pyramid structures having a height of 0.75 inches and a width of 1.25 inches. A schematic cross section of the surface including the pyramids is shown in FIG. 42. The pyramid structures are three dimensional, and a cross section at an angle of 90° would appear the same as that shown in FIG. 42. The measured rotational derivatives for six different lighting angles over a range of viewing directions are presented in FIG. 43. The rotational derivatives of the pyramid surface are slightly higher than those of Lambertian surface for most viewing directions, except when viewed from a grazing viewing direction on the same side as the light source.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

EMBODIMENTS

Embodiment 1. An interior construction product configured to form an interior surface, the interior construction product comprising:

a visible surface covered with a texture including surface features having a height in a range from 4 µm to 2500 µm, the visible surface having an average rotational derivative that is no greater than 1.2*a respective rotational derivative of a Lambertian surface under the same lighting and viewing conditions, wherein the rotational derivative is the percentage change in radiance from the visible surface in a viewing direction when illuminated from an illumination direction as the surface rotates about an axis that is perpendicular to a plane defined by the viewing direction and the illumination direction, wherein the average rotational derivative is the average of first, second, and third rotational derivatives of the visible surface, wherein each of the first, second, and third rotational derivatives correspond to an illumination direction at a first illumination angle from a surface normal of the visible surface, wherein the first rotational derivative corresponds to a viewing direction at a first viewing angle from the surface normal of the visible surface, wherein the second rotational derivative corresponds to a viewing direction at a second viewing angle from the surface normal of the visible surface, and wherein the third rotational derivative corresponds to a viewing direction at a third viewing angle from the surface normal of the visible surface.

Embodiment 2. The interior construction product according to embodiment 1, wherein the first illumination angle is within a range of −88° to −65°, e.g., within a range of −80° to −70°.

Embodiment 3. The interior construction product according to embodiment 1 or embodiment 2, wherein the average rotational derivative of the visible surface is no greater than the respective rotational derivative of the Lambertian surface under the same lighting and viewing conditions, e.g., the average rotational derivative of the visible surface is less than 0.8*the rotational derivative of the Lambertian surface under the same lighting and viewing conditions.

Embodiment 4. The interior construction product according to any of embodiments 1 to 3, wherein the visible surface has an average rotational derivative over a range of illumination angles that is no greater than 1.2*the respective rotational derivatives of the Lambertian surface, e.g., no greater than 1*the respective rotational derivatives of the Lambertian surface, e.g., no greater than 0.8*the respective rotational derivatives of the Lambertian surface.

Embodiment 5. The interior construction product according to embodiment 4, wherein the range of illumination angles extends from −88° to −65°, e.g., from −80° to −70°.

Embodiment 6. The interior construction product according to any of embodiments 1 to 5, wherein the first viewing angle is in a range from 63° to 67°, e.g., 65°, wherein the second viewing angle is in a range from 68° to 72°, e.g., 70°, and wherein the third viewing angle is in a range from 73° to 77°, e.g., 75°.

Embodiment 7. The interior construction product according to any of embodiments 1 to 6, wherein the second viewing angle is at least 5° larger than the first viewing angle, and wherein the third viewing angle is at least 5° larger than the second viewing angle.

Embodiment 8. The interior construction product according to any of embodiments 1 to 7, wherein the surface features provide a roughness to the visible surface such that less than 50% of the visible surface is disposed at an angle smaller than 20° from a macro surface of the visible surface, e.g., less than 30% of the visible surface is disposed at an angle smaller than 20° from the visible surface, e.g., less than 20% of the visible surface is disposed at an angle smaller than 20° from the visible surface.

Embodiment 9. The interior construction product according to embodiment 8, wherein less than 50% of the visible surface is disposed at an angle smaller than 15° from a macro surface of the visible surface, e.g., less than 30% of the visible surface is disposed at an angle smaller than 15° from the macro surface of the visible surface, e.g., less than 20% of the visible surface is disposed at an angle smaller than 15° from the macro surface of the visible surface.

Embodiment 10. The interior construction product according to any of embodiments 1 to 9, wherein the construction product includes a base structure and particles disposed over the base structure that form the surface features of the visible surface.

Embodiment 11. The interior construction product according to embodiment 10, wherein the particles include glass beads, sand, hollow alumina, proppants, ceramics, or minerals.

Embodiment 12. The interior construction product according to embodiment 10 or embodiment 11, wherein the particles have an average diameter in a range from 0.004 mm to 1.5 mm, e.g., from 0.004 mm to 0.125 mm, or 0.1 mm to 0.5 mm, or 0.4 mm to 2.0 mm, or 0.6 mm to 0.8 mm, or 0.75 mm to 1.5 mm.

Embodiment 13. The interior construction product according to any of embodiments 10 to 12, wherein the particles cover at least 10% of the visible surface, e.g., at least 20% of the visible surface, e.g., at least 30% of the visible surface, e.g., at least 50% of the visible surface.

Embodiment 14. The interior construction product according to any of embodiments 10 to 13, wherein the particles are held in a coating disposed over the base structure.

Embodiment 15. The interior construction product according to embodiment 14, wherein the coating includes at least one of primer or paint.

Embodiment 16. The interior construction product according to any of embodiments 10 to 15, wherein the particles have an average roundness index of at least 0.5.

Embodiment 17 The interior construction product according to any of embodiments 10 to 16, wherein the particles have an average sphericity index of at least 0.5.

Embodiment 18. The interior construction product according to any of embodiments 10 to 17, wherein the particles have an average of at least 10 sides, e.g., at least 15 sides, e.g., at least 20 sides.

Embodiment 19. The interior construction product according to any of embodiments 10 to 15, wherein the particles that form the surface features have a base shape and include micro features disposed on a surface of the base shape.

Embodiment 20. The interior construction product according to embodiment 19, wherein the micro features are protruding features that extend outward from the surface of the base shape, e.g., triangular or spherical micro features.

Embodiment 21. The interior construction product according to embodiment 19, wherein the micro features are intruding features that extend inward from the surface of the base shape, e.g., craters.

Embodiment 22. The interior construction product according to any of embodiments 1 to 9, wherein the surface features include intruding features extending inward with respect to the macro surface of the visible surface.

Embodiment 23. The interior construction product according to embodiment 22, wherein the intruding features include craters.

Embodiment 24. The interior construction product according to any of embodiments 1 to 9, wherein the surface features include protruding features extending outward with respect to a macro surface of the visible surface.

Embodiment 25. The interior construction product according to embodiment 24, wherein the protruding features include rounded surface features, e.g., features having a spherical, elliptical or parabolic shape.

Embodiment 26. The interior construction product according to embodiment 25, wherein the protruding features are spherical structures having an overlap in a range of 0 to 50%, e.g., up to 40%, e.g., up to 30%, e.g., up to 20%, e.g., up to 10%.

Embodiment 27. The interior construction product according to any of embodiments 1 to 26,
- wherein each surface feature includes an upper peak and extends to a lower valley,
- wherein the texture includes a rough zone with an upper end at the average height of the upper peaks of the surface features and a lower end at the average depth of the lower valleys,
- wherein the rough zone has a midpoint between the upper end and the lower end,
- wherein a first portion of the visible surface is disposed at an angle smaller than 20° from a macro surface of the visible surface, and
- wherein a majority of the first portion of the visible surface is below the midpoint of the rough zone.

Embodiment 28. The interior construction product according to any of embodiments 1 to 27, wherein the surface features include features having different scales of roughness.

Embodiment 29. The interior construction product according to embodiment 28, wherein a portion of the surface features includes surface features having a height in a range of 100 to 1000 μm.

Embodiment 30. The interior construction product according to embodiment 28 or embodiment 29, wherein the visible surface includes micro-surface features disposed on the surface features, wherein the micro-surface features have a height in a range of 1 to 50 μm.

Embodiment 31. The interior construction product according to any of embodiments 1 to 30, wherein the construction product includes a base structure, and wherein the surface features are formed on the base structure.

Embodiment 32. The interior construction product according to any of embodiments 1 to 31, wherein the construction product includes a base structure and an overlay disposed on the base structure that forms the visible surface, and wherein the surface features are formed on the overlay.

Embodiment 33. The interior construction product according to any of embodiments 1 to 32, wherein the visible surface includes a layer of paint.

Embodiment 34. The interior construction product according to any of embodiments 1 to 33, wherein the construction product is a wall board.

Embodiment 35. The interior construction product according to any of embodiments 1 to 33, wherein the construction product is a ceiling panel.

Embodiment 36. An interior construction surface comprising:
- a first interior construction product according to any of embodiments 1 to 35;
- a second interior construction product according to any of embodiments 1 to 35 adjacent to the first interior construction product and positioned such that the visible surface of the second interior construction product is substantially parallel to the visible surface of the first interior construction product.

What is claimed is:

1. An interior construction, the interior construction comprising:
    a first wall board having an edge;
    a second wall board having an edge, the second wall board being positioned next to the first wall board so that the edge of the first wall board and the edge of the second wall board from a joint therebetween; and
    a joint compound disposed in the joint, the joint compound forming, a depression or a bump with respect to the first wall board and the second wall board, the joint compound having a visible surface covered with a texture including surface features having a height in a range from 20 μm to 2500 μm, the joint compound including particles disposed at the visible surface that form the surface features of the visible surface, wherein the surface features provide a roughness to the visible surface such that less than 50% of the visible surface is disposed at an angle smaller than 20° from a macro surface of the visible surface, and wherein the visible surface has an average rotational derivative over a range of illumination angles in the range of −88° to −65° that is no greater than 1.2*a respective rotational derivative of a Lambertian surface under the same lighting and viewing conditions,
    wherein the rotational derivative is the percentage change in radiance from the visible surface in a viewing direction when illuminated from an illumination direction as the surface rotates about an axis that is perpendicular to a plane defined by the viewing direction and the illumination direction,
    wherein the average rotational derivative is the average of first, second, and third rotational derivatives of the visible surface,
    wherein each of the first, second, and third rotational derivatives correspond to an illumination direction at a first illumination angle in the range of −88° to −65° from a surface normal of the visible surface,
    wherein the first rotational derivative corresponds to a viewing direction at a first viewing angle in the range of 63-67° from the surface normal of the visible surface,
    wherein the second rotational derivative corresponds to a viewing direction at a second viewing angle in the range of 68-72° from the surface normal of the visible surface,
    wherein the third rotational derivative corresponds to a viewing direction at a third viewing angle in the range of 73-78° from the surface normal of the visible surface,
    wherein the second viewing angle is at least 5° larger than the first viewing angle, and wherein the third viewing angle is at least 5° larger than the second viewing angle.

2. The interior construction according to claim 1, wherein the average rotational derivative of the visible surface over the range of viewing angles is no greater than the respective rotational derivative of the Lambertian surface under the same lighting and viewing conditions.

3. The interior construction according to claim 1, wherein the visible surface has an average rotational derivative over the range of illumination angles that is no greater than 1.2*the respective rotational derivatives of the Lambertian surface.

4. The interior construction according to claim 1, wherein the particles include glass beads, sand, hollow alumina, proppants, ceramics, or minerals.

5. The interior construction according to claim 1, wherein the particles have an average diameter in a range from 40 µm to 125 µm.

6. The interior construction according to claim 1, wherein the particles have an average diameter in a range from 400 µm to 2000 µm.

7. The interior construction according to claim 1, wherein the particles cover at least 10% of the visible surface.

8. The interior construction according to claim 1, wherein the particles are held in a coating disposed at the visible surface.

9. The interior construction according to claim 8, wherein the coating includes at least one of primer or paint.

10. The interior construction according to claim 1, wherein the particles have an average roundness index of at least 0.5.

11. The interior construction according to claim 1, wherein the particles have an average of at least 10 sides.

12. The interior construction according to claim 1, wherein the visible surface includes a layer of paint.

13. The interior construction of claim 1, wherein the joint compound forms a bump with respect to the first wall board and the second wall board.

14. The interior construction of claim 1, wherein the joint compound forms a depression with respect to the first wall board and the second wall board.

15. The interior construction of claim 1, wherein the joint compound is disposed to cover a fastener fastening the first wall board to a building.

16. The interior construction of claim 1, wherein the visible surface includes micro-surface features disposed on the surface features, the micro-surface features having heights in the range of 1-50 microns.

17. The interior construction of claim 1, wherein the first wall board and the second wall board are drywall wall boards.

\* \* \* \* \*